(12) United States Patent
Dormody et al.

(10) Patent No.: US 12,553,744 B2
(45) Date of Patent: Feb. 17, 2026

(54) IDENTIFYING ERRONEOUS CALIBRATION VALUES OF BAROMETRIC AIR PRESSURE SENSOR

(71) Applicant: NextNav, LLC, Sunnyvale, CA (US)

(72) Inventors: Michael Dormody, San Jose, CA (US); Guiyuan Han, San Jose, CA (US); Badrinath Nagarajan, Cupertino, CA (US); Arun Raghupathy, Bangalore (IN)

(73) Assignee: NextNav, LLC, Santa Clara, CA (US)

( * ) Notice: Subject to any disclaimer, the term of this patent is extended or adjusted under 35 U.S.C. 154(b) by 436 days.

(21) Appl. No.: 18/151,178

(22) Filed: Jan. 6, 2023

(65) Prior Publication Data

US 2023/0221144 A1     Jul. 13, 2023

Related U.S. Application Data

(60) Provisional application No. 63/298,379, filed on Jan. 11, 2022.

(51) Int. Cl.
*G01C 25/00* (2006.01)
*G01C 5/06* (2006.01)

(52) U.S. Cl.
CPC ............ *G01C 25/00* (2013.01); *G01C 5/06* (2013.01)

(58) Field of Classification Search
CPC ...................................................... G01C 5/06
See application file for complete search history.

(56) References Cited

U.S. PATENT DOCUMENTS

| 2015/0133145 | A1* | 5/2015 | Palanki ............... H04W 64/006 455/456.1 |
| 2021/0164779 | A1 | 6/2021 | Dormody et al. |
| 2021/0389204 | A1 | 12/2021 | Dormody et al. |

OTHER PUBLICATIONS

International Search Report and Written Opinion dated Jun. 2, 2023 for PCT Patent Application No. PCT/IB2023/050122.

* cited by examiner

*Primary Examiner* — Walter L Lindsay, Jr.
*Assistant Examiner* — Andrew V Do
(74) *Attorney, Agent, or Firm* — MLO, a professional corp.

(57) ABSTRACT

A method involves identifying multiple calibration values and corresponding calibration confidence values of an initial calibration dataset in which one or more calibration values were derived using an atmospheric pressure measurement from a barometric air pressure sensor of a mobile device. A calibration metric is determined for each calibration value. One or more of the calibration values are filtered out from the initial calibration dataset based on the calibration metric to generate a filtered calibration dataset. A filtered calibration value is determined using the filtered calibration dataset. The barometric air pressure sensor of the mobile device is calibrated using the filtered calibration value.

18 Claims, 21 Drawing Sheets

| Calibration | Calibration Offset Value (Pa) | Calibration Confidence (Pa) |
|---|---|---|
| Calibration 1 | -24.8 | 37.1 |
| Calibration 2 | 100 | 120 |
| Calibration 3 | -28.9 | 14.7 |
| Calibration 4 | -18.6 | 20.4 |
| Calibration 5 | -18.6 | 20.4 |

| Calibration | Calibration value (Pa) | Calibration Confidence (Pa) |
|---|---|---|
| Calibration 1 | -24.8 | 37.1 |
| Calibration 2 | 100 | 40 |
| Calibration 3 | -28.9 | 14.7 |
| Calibration 4 | -18.6 | 20.4 |
| Calibration 5 | -18.6 | 20.4 |

FIG. 8B
802

| Calibration | Calibration value (Pa) | Calibration Confidence (Pa) |
|---|---|---|
| Calibration 1 | 24.8 | 37.1 |
| Calibration 2 | -100 | 40 |
| Calibration 3 | 28.9 | 14.7 |
| Calibration 4 | 18.6 | 20.4 |
| Calibration 5 | 18.6 | 20.4 |

| Calibration to check | Calibration to check against | Z-metric |
|---|---|---|
| Calibration 1 | Calibration 2 | -3.36 |
| Calibration 1 | Calibration 3 | 0.11 |
| Calibration 1 | Calibration 4 | -0.17 |
| Calibration 1 | Calibration 5 | -0.17 |
| Calibration 2 | Calibration 1 | 3.12 |
| Calibration 2 | Calibration 3 | 3.22 |
| Calibration 2 | Calibration 4 | 2.97 |
| Calibration 2 | Calibration 5 | 2.97 |
| Calibration 3 | Calibration 1 | -0.28 |
| Calibration 3 | Calibration 2 | -8.79 |
| Calibration 3 | Calibration 4 | -0.70 |
| Calibration 3 | Calibration 5 | -0.70 |
| Calibration 4 | Calibration 1 | 0.30 |
| Calibration 4 | Calibration 2 | -5.82 |
| Calibration 4 | Calibration 3 | 0.50 |
| Calibration 4 | Calibration 5 | 0 |
| Calibration 5 | Calibration 1 | 0.30 |
| Calibration 5 | Calibration 2 | -5.82 |
| Calibration 5 | Calibration 3 | 0.50 |
| Calibration 5 | Calibration 4 | 0 |

| Calibration to check | Calibration to check against | Z-metric |
|---|---|---|
| Calibration 1 | Calibration 2 | 3.36 |
| Calibration 1 | Calibration 3 | -0.11 |
| Calibration 1 | Calibration 4 | 0.17 |
| Calibration 1 | Calibration 5 | 0.17 |
| Calibration 2 | Calibration 1 | -3.12 |
| Calibration 2 | Calibration 3 | -3.22 |
| Calibration 2 | Calibration 4 | -2.97 |
| Calibration 2 | Calibration 5 | -2.97 |
| Calibration 3 | Calibration 1 | 0.28 |
| Calibration 3 | Calibration 2 | 8.79 |
| Calibration 3 | Calibration 4 | 0.70 |
| Calibration 3 | Calibration 5 | 0.70 |
| Calibration 4 | Calibration 1 | -0.30 |
| Calibration 4 | Calibration 2 | 5.82 |
| Calibration 4 | Calibration 3 | -0.50 |
| Calibration 4 | Calibration 5 | 0 |
| Calibration 5 | Calibration 1 | -0.30 |
| Calibration 5 | Calibration 2 | 5.82 |
| Calibration 5 | Calibration 3 | -0.50 |
| Calibration 5 | Calibration 4 | 0 |

| Calibration to check | No. of individual Z-metrics that exceed the defined threshold |
|---|---|
| Calibration 1 | 0 |
| Calibration 2 | 4 |
| Calibration 3 | 0 |
| Calibration 4 | 0 |
| Calibration 5 | 0 |

1000

| Calibration to check | Average of Z-metrics |
|---|---|
| Calibration 1 | -0.90 |
| Calibration 2 | 3.07 |
| Calibration 3 | -2.62 |
| Calibration 4 | -1.26 |
| Calibration 5 | -1.26 |

| Calibration | Calibration value (Pa) | Calibration Confidence (Pa) |
|---|---|---|
| Calibration1 | -24.8 | 150 |
| Calibration2 | 100 | 40 |

FIG. 15
1500

| Calibration to check | Calibration to check against | Z-metric |
|---|---|---|
| Calibration 1 | Calibration 2 | -0.832 |
| Calibration 2 | Calibration 1 | 3.12 |

FIG. 16
1600

| Calibration | Calibration value (Pa) | Calibration Confidence (Pa) |
|---|---|---|
| Calibration 1 | 150 | 37.1 |
| Calibration 2 | 100 | 40 |
| Calibration 3 | -28.9 | 14.7 |
| Calibration 4 | -18.6 | 20.4 |
| Calibration 5 | -18.6 | 20.4 |

FIG. 18

| Calibration to check | Calibration to check against | Z-metric |
|---|---|---|
| Calibration 1 | Calibration 2 | 1.35 |
| Calibration 1 | Calibration 3 | 4.82 |
| Calibration 1 | Calibration 4 | 4.54 |
| Calibration 1 | Calibration 5 | 4.54 |
| Calibration 2 | Calibration 1 | -1.25 |
| Calibration 2 | Calibration 3 | 3.22 |
| Calibration 2 | Calibration 4 | 2.97 |
| Calibration 2 | Calibration 5 | 2.97 |
| Calibration 3 | Calibration 1 | -12.20 |
| Calibration 3 | Calibration 2 | -8.79 |
| Calibration 3 | Calibration 4 | -0.70 |
| Calibration 3 | Calibration 5 | -0.70 |
| Calibration 4 | Calibration 1 | -8.28 |
| Calibration 4 | Calibration 2 | -5.82 |
| Calibration 4 | Calibration 3 | 0.50 |
| Calibration 4 | Calibration 5 | 0 |
| Calibration 5 | Calibration 1 | -8.28 |
| Calibration 5 | Calibration 2 | -5.82 |
| Calibration 5 | Calibration 3 | 0.50 |
| Calibration 5 | Calibration 4 | 0 |

FIG. 19

| Calibration to check | No. of individual Z-metrics exceed the defined threshold |
|---|---|
| Calibration 1 | 3 |
| Calibration 2 | 3 |
| Calibration 3 | 0 |
| Calibration 4 | 0 |
| Calibration 5 | 0 |

2000

2100

2200

2300

2400

IDENTIFYING ERRONEOUS CALIBRATION VALUES OF BAROMETRIC AIR PRESSURE SENSOR

RELATED APPLICATIONS

This application claims priority to U.S. Provisional Patent Application No. 63/298,379, filed Jan. 11, 2022, all of which is incorporated by reference herein in its entirety for all purposes.

BACKGROUND

Determining the exact location of a mobile device (e.g., a phone, laptop computer, tablet, or other device) in an environment can be quite challenging, especially when the mobile device is located in an urban environment or is located within a building. Imprecise estimates of the mobile device's position may have "life or death" consequences for the user. For example, an imprecise position estimate of a mobile device, such as a mobile phone operated by a user calling 911, can delay emergency personnel response times. In less dire situations, imprecise estimates of the mobile device's position can negatively impact navigation applications by sending a user to the wrong location or taking too long to provide accurate directions.

An altitude estimate of the mobile device may be determined using atmospheric pressure measurements made using a barometric air pressure sensor at the mobile device, in addition to other data such as a reference pressure measured by a reference pressure network. However, due to imperfections in the barometric air pressure sensor, such as sensor drift, the barometric air pressure sensor may need to be calibrated using a calibration value derived from calibration data to produce accurate measurements.

The calibration data typically includes, but is not limited to, atmospheric pressure and temperature measurements generated using the barometric air pressure sensor to be calibrated in addition to reference pressure and temperature measurements generated by a reference system. The derived calibration value may be an offset in pressure, an offset in altitude, or a polynomial calibration equation that takes various inputs, such as temperature or pressure.

Calibration values used to calibrate the barometric air pressure sensor of the mobile device can be determined by measuring a height difference between an estimated altitude reported by the mobile device and a known reference height. The known reference height may be the height of a terrain retrieved from a terrain database, or a floor height when the mobile device is indoors, along with an estimated offset above the ground or floor that represents the mobile device being held by a user.

Due to the lack of widespread floor-level elevation database availability and the challenge of obtaining accurate indoor positions, outdoor atmospheric pressure data is more frequently used than indoor atmospheric pressure data to calibrate the barometric air pressure sensor. This is because when the mobile device is outdoors (and not on a manmade structure like a parking lot or bridge), the determined height difference is the difference between the altitude derived using the barometric air pressure sensor of the mobile device and the terrain height, plus an optional offset. This height difference can be used to estimate a calibration value for the mobile device's barometric air pressure sensor.

However, estimated calibration values may not always reflect a true or optimal sensor calibration value, owing to different reasons such as i) vertical displacement between values from a terrain database and a true altitude of the mobile device, ii) HVAC pressurization when the mobile device is in a car or building, and/or iii) terrain height errors caused because of an erroneous estimated 2D position of the mobile device.

SUMMARY

In some embodiments, a method involves identifying multiple calibration values and corresponding calibration confidence values of an initial calibration dataset in which one or more of the calibration values were derived using an atmospheric pressure measurement from a barometric air pressure sensor of a mobile device. A calibration metric is determined for each of the calibration values. One or more of the calibration values are filtered out from the initial calibration dataset based on the calibration metric to generate a filtered calibration dataset. A filtered calibration value is determined using the filtered calibration dataset. The barometric air pressure sensor of the mobile device is calibrated using the filtered calibration value.

In some embodiments, an apparatus includes a barometric air pressure sensor, a data storage module, and a processor. The processor is configured to identify multiple calibration values and corresponding calibration confidence values of an initial calibration dataset in which one or more of the calibration values were derived using an atmospheric pressure measurement from the barometric air pressure sensor of the apparatus. A calibration metric is determined for each of the calibration values. One or more of the calibration values is filtered out from the initial calibration dataset based on the calibration metric to generate a filtered calibration dataset. A filtered calibration value is determined using the filtered calibration dataset. The barometric air pressure sensor of the apparatus is calibrated using the filtered calibration value.

BRIEF DESCRIPTION OF THE DRAWINGS

FIGS. 4-5 illustrate calibration values determined in the operational environment shown in FIG. 3, in accordance with some embodiments.

FIGS. 7-11 illustrate calibration values determined in an operational environment, in accordance with some embodiments.

FIGS. 13-19 illustrate calibration values and calibration metrics determined in an operational environment, in accordance with some embodiments.

DETAILED DESCRIPTION

Systems and methods for identifying erroneous or unreliable calibration values of a barometric air pressure sensor of a mobile device are described below. A barometric air pressure sensor is also referred to as an atmospheric pressure sensor herein. A calibration value, as referred to herein, is a set of values that includes a calibration offset value and a calibration confidence value. The calibration offset value may be expressed as single value or as a polynomial.

Figure 1:
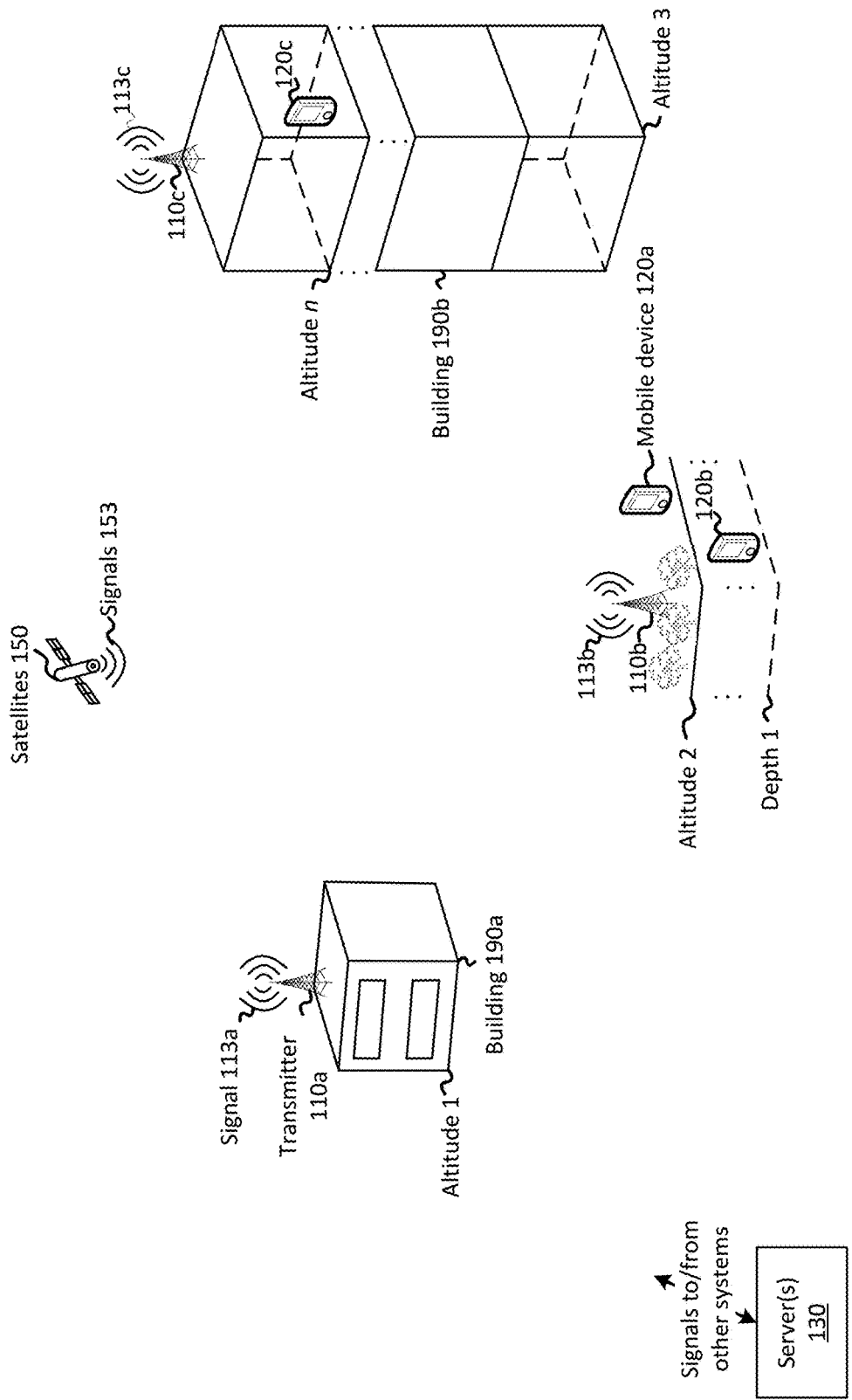
FIG. 1 shows an example of an operational environment for identifying erroneous calibration values of a barometric air pressure sensor of a mobile device, in accordance with some embodiments.

Attention is initially drawn to an operational environment 100 for a mobile device in FIG. 1. The operational environment 100 contains a network of terrestrial transmitters 110a-c, any number of mobile devices 120a-c, any number of buildings 190a-b, any number of satellites 150, and any number of servers 130. Also shown are signals 113a-c associated with the respective transmitters 110a-c, signals 153 associated with the satellites 150, altitude designations Altitude 1-n, and a depth designator Depth 1.

The transmitters 110a-c and the mobile devices 120a-c may be located at different altitudes or depths that are inside or outside various natural or manmade structures (e.g., the buildings 190a-b). The signals 113a-c and 153 are exchanged between the mobile devices 120a-c, the transmitters 110a-c, and the satellites 150 using known wireless or wired transmission technologies. The transmitters 110a-c may transmit the signals 113a-c using one or more common multiplexing parameters—e.g., time slot, pseudorandom sequence, or frequency offset. The servers 130 and the mobile devices 120a-c may exchange information with each other. The transmitters 110a-110c may be part of a reference pressure network.

To determine an estimated altitude for a particular mobile device 120a-c, an atmospheric pressure measurement is generated by a barometric air pressure sensor (a "pressure sensor", or "atmospheric pressure sensor") of that mobile device, as is known in the art. The estimated altitude is derived using the measurement of pressure and assistance data from reference sensors of a reference pressure network that measure pressures and temperatures at different locations within the operational environment 100. One example of estimating a mobile device's altitude using measurements of pressure is an altimeter/barometric-based approach described in U.S. Pat. No. 9,057,606, issued Jun. 16, 2015, and incorporated herein in its entirety.

For example, a reference pressure ($P_{reference}$) a reference temperature (T), and an atmospheric pressure measured by a mobile device ($P_{mobile\ device}$) may be used to estimate the altitude of that mobile device ($Altitude_{estimated}$) as follows:

$$Altitude_{estimated} = \frac{RT}{gM} \ln\left(\frac{P_{reference}}{P_{mobile\ device}}\right) \quad \text{(Equation 1)}$$

where g corresponds to the acceleration due to gravity, R is the universal gas constant, and M is the molar mass of dry air. The reference pressure ($P_{reference}$) may be a measurement of pressure from a reference pressure sensor of a reference pressure network or may be an estimated pressure for a reference altitude that is based on the measurement of pressure from the reference pressure sensor.

Unfortunately, estimated altitudes that are derived using measured pressure by a mobile device can be inaccurate when the measured pressure is subject to unacceptable error caused by drift of the barometric air pressure sensor that generated the measurement. The drift may be monotonic (i.e., only increasing or only decreasing), or it may gradually change direction and return towards zero accumulated drift. The time scale over which the sensor drifts into an unstable state that produces an unacceptable error can be anything from several minutes, to several days, to several weeks, or longer. The time scale and amount of the drift will determine how frequently the pressure sensor must be calibrated. In one embodiment, an unacceptable error level is an error level that exceeds a threshold amount of error (e.g., 12 Pa or 20 Pa for barometric air pressure sensors).

Since errors may be introduced into an estimated altitude of the mobile device when a measurement from an unstable barometric air pressure sensor is used, it is desirable to estimate the error in the measurement and then use that estimated error to calibrate future measurements by the unstable pressure sensor. If an estimated altitude of the mobile device can be determined without using erroneous measurements from the unstable pressure sensors, then errors due to the drift of the unstable pressure sensor can be measured and logged over time.

Calibration of unstable sensors is described in U.S. Pat. No. 10,551,271, issued Feb. 4, 2020, U.S. Pat. No. 11,215,453, issued on Jan. 4, 2022, and U.S. Provisional Patent Application No. 63/264,119, filed Nov. 16, 2021, all of which are incorporated herein in their entirety.

In some embodiments, an initial calibration dataset is filtered to remove erroneous calibration values therefrom. The resultant calibration dataset is referred to as a filtered calibration dataset. The filtered calibration dataset includes one or more calibration values which may be used to derive a "filtered" calibration value that is used to calibrate the barometric air pressure sensor of the mobile device.

In some embodiments, calibration values described herein include a calibration offset value and an associated calibration confidence value. In other embodiments, the calibration values described herein may include one or more calibration coefficient values (e.g., of a polynomial calibration equation that takes various inputs such as temperature or pressure) and an associated calibration confidence value. In yet other embodiments, calibration values described herein may include both a calibration offset value and one or more calibration coefficient values, as well as an associated calibration confidence value. Although calibration offset values are primarily referred to in the examples provided herein, it is understood that any of the calibration offset values could instead be a calibration polynomial depending on design preferences or design requirements of the associated calibration system.

The calibration system may involve one or more processes executed at the server 130 and/or the mobile device 120a-c to generate calibration values based on atmospheric pressure measurements made at the mobile device. The calibration system may generate the calibration values based on atmospheric pressure measurements made by the mobile device 102 in addition to other data, such as an estimated position of the mobile device 102 and terrain and/or building data retrieved from a database based on the estimated position of the mobile device 102.

The initial and filtered calibration datasets include one or more of such calibration values and can be implemented in numerous ways, such as using a database or a list (e.g., at the server 130 or at a mobile device). The calibration datasets may include calibration values that are derived using pressure measurements made by the barometric air pressure sensor of the mobile device at multiple respective locations and/or at multiple times. For example, the calibration datasets may include calibration values that were derived for the mobile device when it was at five different locations. Additionally, the calibration datasets may include calibration values that were derived for the mobile device across multiple time periods, such as a several-hour period, a several-day period, or a several-week period, and/or calibration values that were derived using different calibration methods.

The filtered calibration value that is used to calibrate the pressure sensor of the mobile device could be a central tendency of the calibration values in the filtered calibration dataset (e.g., a mean or median), a most recent calibration value of the filtered calibration dataset, or another combination or selection of values therein.

As mentioned above, in some circumstances, one or more calibration values within the initial calibration dataset may be erroneous or unreliable. In such circumstances, a calibration value derived using the initial calibration dataset would also be erroneous to a greater or lesser extent. Disclosed herein are systems and methods to identify such erroneous or unreliable calibration values within an initial calibration dataset. Identified, or suspect, calibration values are then filtered from the initial calibration dataset to generate a filtered calibration dataset, thereby advantageously improving the performance of the calibration system by mitigating error in a filtered calibration value derived using the calibration dataset.

In some embodiments, filtering a calibration value from the initial calibration dataset involves deleting that calibration value from the initial calibration dataset. In other embodiments, filtering a calibration value from the initial calibration dataset involves weighting that calibration value such that the calibration value contributes less to the filtered calibration value as compared to a calibration value that was not filtered from the initial calibration dataset. In yet other embodiments, filtering a calibration value from the initial calibration dataset involves flagging that calibration value as a suspect calibration value for postprocessing by the calibration system and/or server.

In some embodiments, after such filtering is done, a filtered calibration value is derived using the filtered calibration dataset, as described above, and the filtered calibration value is used to calibrate the barometric air pressure sensor of the mobile device. In some embodiments, the filtered calibration value determined using the calibration dataset is applied to pressure measurements made by the pressure sensor thereafter (e.g., a pressure offset value is added to, or subtracted from, a pressure measurement). In other embodiments, the filtered calibration value determined using the filtered calibration dataset is applied to altitude estimates made using the pressure sensor thereafter.

Figure 2:
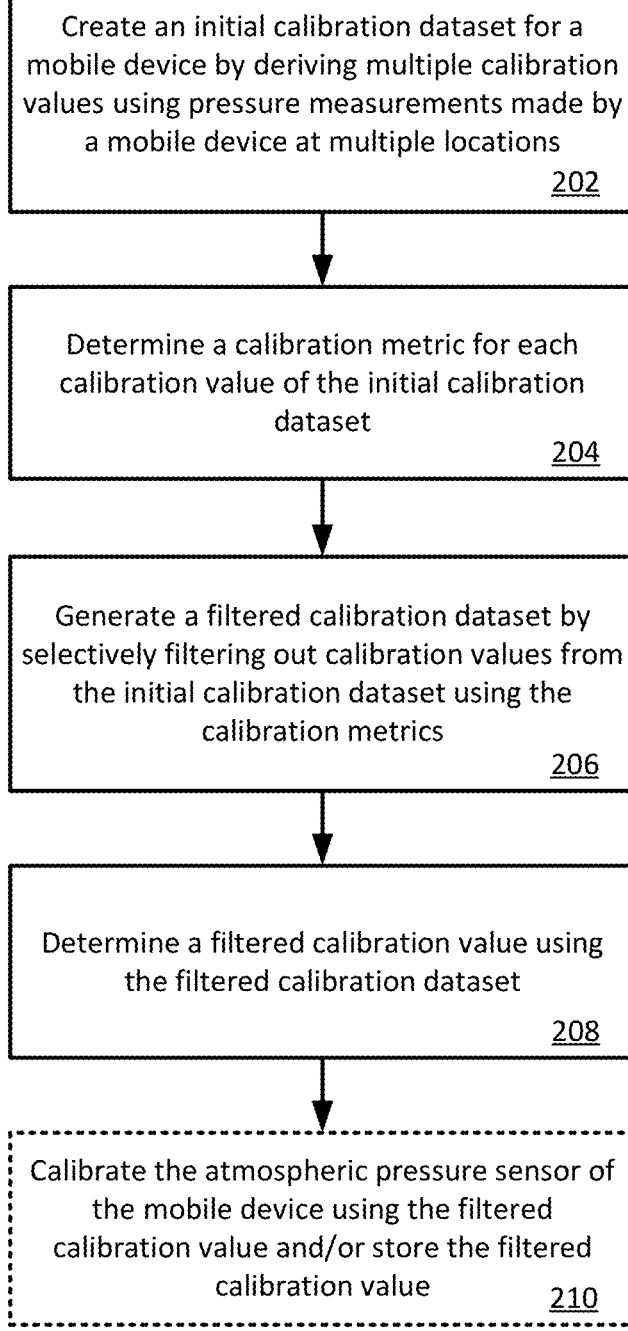
FIG. 2 is a portion of an example portion of a process for identifying erroneous calibration values of a barometric air pressure sensor, in accordance with some embodiments.

FIG. 2 shows a simplified example process 200 for filtering erroneous calibration values from an initial calibration dataset, in accordance with some embodiments. The particular steps, order of steps, and combination of steps are shown for illustrative and explanatory purposes only. Other embodiments can implement different particular steps, orders of steps, and combinations of steps to achieve similar functions or results.

At step 202, an initial calibration dataset is created for a mobile device by deriving multiple calibration values using pressure measurements made by a barometric air pressure sensor of the mobile device at multiple locations and/or at multiple times. In some embodiments, the initial calibration dataset is stored in a database at the mobile device and/or the servers 130. At step 204, a calibration metric is determined for each calibration value of the initial calibration dataset. Examples of calibration metrics are described in detail below. At step 206, a filtered calibration dataset is generated by selectively filtering out calibration values from the initial calibration set using the calibration metrics. In some embodiments, filtering out a calibration value from the initial calibration dataset involves removing that calibration value from the initial calibration dataset. In other embodiments, filtering out a calibration value from the initial calibration dataset involves applying a lower weight to that calibration value as compared to other calibration values when values of the filtered calibration dataset are used to create a filtered calibration value (e.g., such as a weighted average).

At step 208, a filtered calibration value is determined using the filtered calibration dataset. In some embodiments, the filtered calibration value is a central tendency of the calibration values of the filtered calibration dataset such as a mean or median. In other embodiments, the filtered calibration value is a weighted central tendency of the calibration values of the filtered calibration dataset, such as a weighted average. In yet other embodiments, the filtered calibration value may be a most recent calibration value from the filtered calibration dataset. In still yet other embodiments, the filtered calibration value may be a calibration value from the filtered calibration dataset having the lowest calibration confidence value as compared to the calibration confidence values of the other calibration values in the filtered calibration dataset.

In some embodiments, at step 210, the filtered calibration value is used to calibrate the barometric air pressure sensor of the mobile device. In other embodiments, the filtered calibration value is further used to determine an altitude estimate of the mobile device using the barometric air pressure sensor. In yet other embodiments, the filtered calibration value is stored at the mobile device and/or at the server(s) 130 for later use.

Embodiments of the example process 200 shown in FIG. 2 for filtering erroneous calibration values from the initial calibration dataset are described below and include (i) filtering out "indoor" calibration values derived using indoor atmospheric pressure data, (ii) applying an "erroneous outdoor data filter" on calibration values of the initial calibration dataset, (iii) combining the erroneous outdoor data filter and other information, (iv) checking against recent previous calibration values, (v) checking against a calibration history of the barometric sensor, (vi) peer-to-peer calibration against a calibrated device at the same location as the mobile device, and/or (vii) filtering calibration values from the initial calibration dataset that were derived when the mobile device was within a vehicle and was therefore likely impacted by an HVAC system of that vehicle. The following are some use case examples for each embodiment.

Indoor Filter

Figure 3:
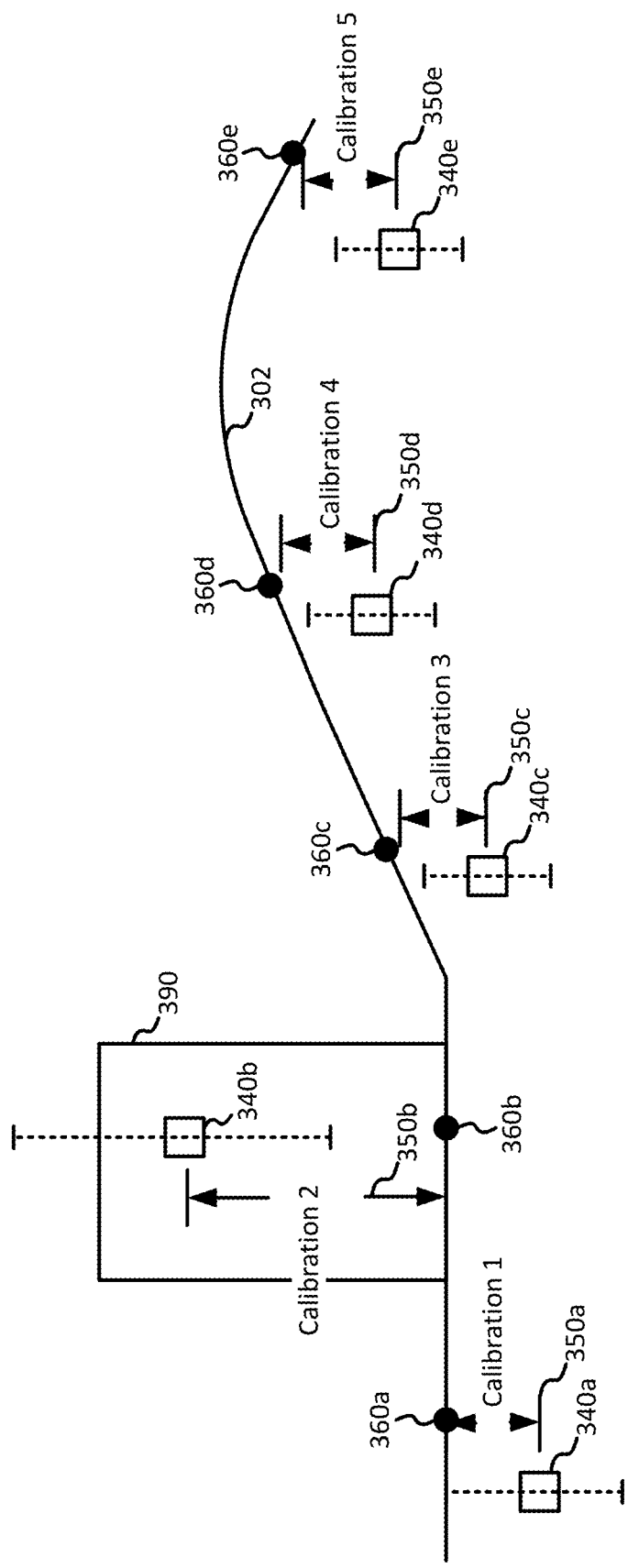
FIG. 3 is an example environment for identifying erroneous calibration values of a barometric air pressure sensor, in accordance with some embodiments.

FIG. 3 illustrates a graphical representation of calibration values determined in an operational environment 300, in accordance with some embodiments. The operational environment 300, depicted in profile, includes terrain 302, a building 390, 2D positions 360*a-e* of a mobile device (not shown) in five different locations, and calibration values

350*a-e*, labeled as Calibration 1-5, associated with each of those five 2D positions. Details of each of the calibration values 350*a-e* are illustrated in a graph 400 of FIG. 4 and a Table 500 of FIG. 5.

Figure 4:
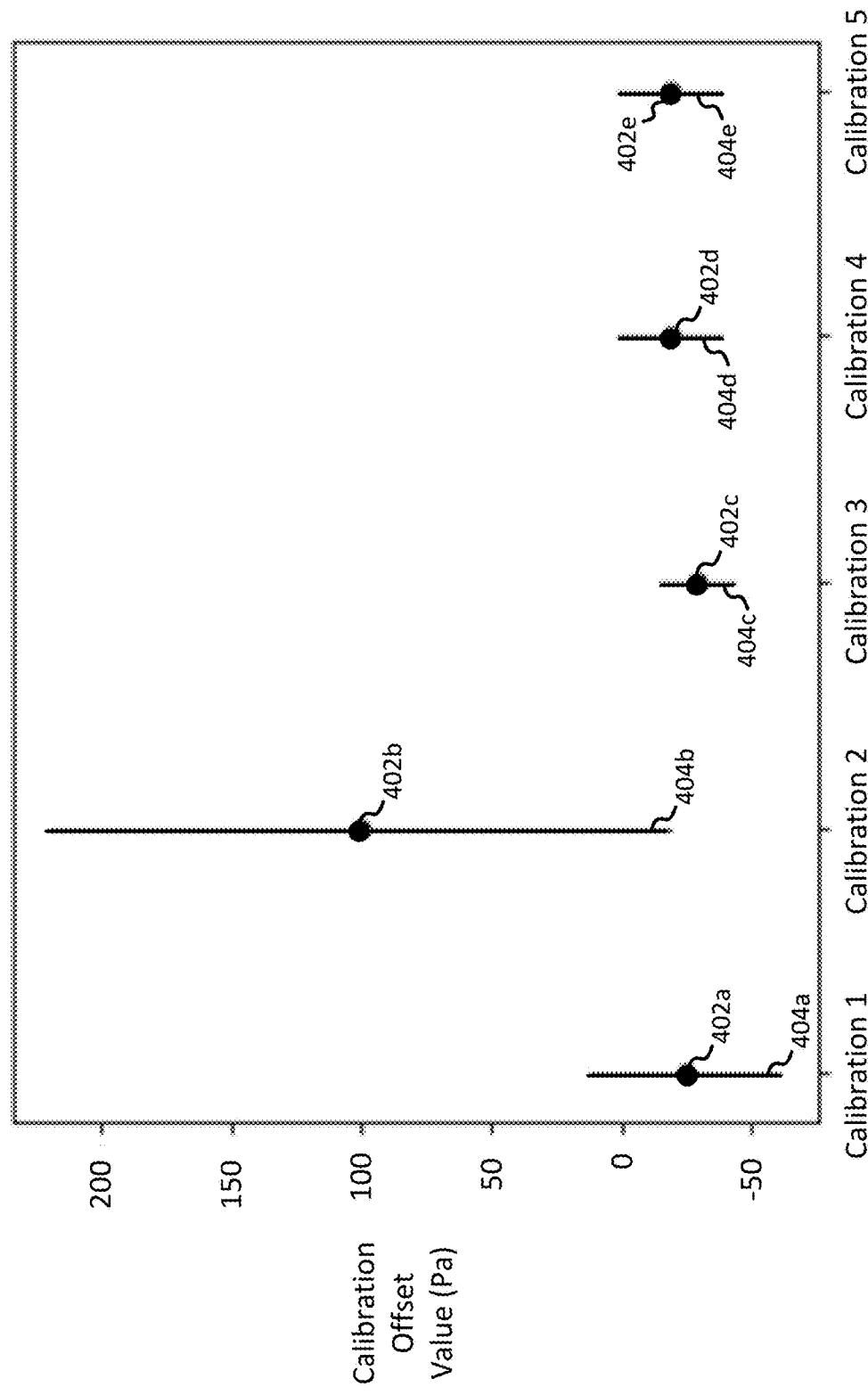

The graph 400 of FIG. 4 includes further details of the calibration values 350*a-e* introduced in FIG. 3 and which are labeled Calibration 1-5. Each of the calibration values Calibration 1-5 has a respective calibration offset value 402*a-e* and a respective calibration confidence value 404*a-e*. The calibration confidence value may be a confidence interval or a confidence level. A confidence interval is a range of estimates for an unknown parameter. A confidence level is a proportion of corresponding confidence intervals that contain the true value of the unknown parameter. As is understood in the art, a larger calibration confidence value is indicative of greater uncertainty in the calibration offset value as compared to a smaller calibration confidence value. Numerical values of the calibration offset values 402*a-e* and calibration confidence values 404*a-e* for the calibration values Calibration 1-5 are shown in the Table 500 of FIG. 5, all in Pa. In some embodiments, Table 500 is a simplified example of an initial calibration dataset (i.e., a calibration set that has not yet been filtered).

With reference to FIG. 3, the mobile device may be at terrain level at each of the 2D positions 360*a-e* (e.g., lying flat on the ground), may be somewhat vertically offset from the terrain level at each of the 2D positions 360*a-e* (e.g., placed on a table, held by a user, or placed in a pocket of the user's clothing), or may be significantly vertically offset from the terrain level at each of the 2D positions (e.g., if it is located on an upper floor of a building or located on a man-made structure like a bridge). Each of the calibration values 350*a-e* is shown as a vertical distance offset (e.g., in meters) or a pressure measurement offset (e.g., in Pa). Also shown are associated error bars 340*a-e* that are representative of a calibration confidence value for each of the five calibration values 350*a-e*.

Each of the calibration values 350*a-e* is derived using data that includes atmospheric pressure measurements generated by a barometric air pressure sensor of the mobile device at the location associated with a respective one of the 2D positions 360*a-e*. The calibration values 350*a-e* may be different from each other according to i) the 2D position of the mobile device, and ii) a height difference between the mobile device's reported altitude and the height of the terrain 302 at which the mobile device was located (e.g., at the terrain level, or vertically offset from the terrain level).

In the case of calibration value Calibration 2, the mobile device's 2D position 360*b* was inside the building 390 and the mobile device was on a floor that is above ground level (e.g., when the mobile device 120*c* is at Altitude n in FIG. 1). Because the mobile device was within the building 390 on a floor that is above ground level (e.g., on a higher floor), a higher calibration offset value is derived for the mobile device as compared to all of the other calibration offset values that were derived when the mobile device was outside and relatively close to terrain 302, e.g., Calibration 1 at position 360*a*. The corresponding calibration offset values 402*a* for Calibration 1 and 402*b* for Calibration 2 are illustrated graphically in FIG. 4 and provided numerically in FIG. 5.

Additionally, in some embodiments, a larger calibration confidence value is assigned by the calibration system to calibration values derived for the mobile device when it is inside of a building as compared to when the mobile device is outdoors. This is because when the mobile device is indoors, e.g., at position 360*b*, there is increased uncertainty of the mobile device's exact location when it is on one of the higher floors of the building 390. Additionally, there may be anomalies in pressure measurements made by the mobile device indoors due to stack effect and/or from an HVAC system of the building. As such, the calibration system assigns a larger confidence level to calibration values derived when the mobile device is indoors as compared to when the mobile device is outdoors, e.g., at position 360*a*. For example, as shown in the Table 500, the calibration confidence value for Calibration 1 (37.1 Pa) derived when the mobile device was outdoors is significantly less than the calibration confidence value for Calibration 2 (120 Pa) derived when the mobile device was indoors.

Because calibration values derived when the mobile device is indoors may be less accurate than calibration values derived when the mobile device is outside, in one embodiment, a calibration metric is determined for each of the calibration values of an initial calibration dataset that indicates whether that particular calibration value was derived using pressure measurements made when the associated mobile device was inside of a building. Then, calibration values from an initial calibration dataset that are identified as having been derived using pressure measurements inside of a building are advantageously filtered from the initial calibration dataset to generate a filtered calibration dataset.

For example, if a reported 2D position associated with the calibration value Calibration 2 accurately indicates that Calibration 2 was derived when the mobile device was inside of the building 390 (as shown in FIG. 3), then the calibration value Calibration 2 can be advantageously filtered from a calibration dataset.

In some embodiments, as described with reference to FIGS. 18-20, it may be determined that a mobile device is indoors based on a positional relationship between an estimated 2D position area of the mobile device and a building footprint associated with the building 390 that is retrieved from a building or terrain database. In other embodiments, determining that a mobile device is indoors may involve an Indoor/Outdoor determination method, such as that described in U.S. Pat. No. 9,998,874, which was issued on Jun. 12, 2018, or that of U.S. Pat. No. 10,602,476, which was issued on Mar. 24, 2020, both of which are incorporated herein in their entirety.

In such embodiments, with reference to step 204 of the process 200, a calibration metric for each calibration value of the initial calibration dataset may include a value indicating whether that calibration value was derived using atmospheric pressure measurements made indoors. The calibration metric may also include another value that represents a confidence level of the indoor/outdoor determination. In such embodiments, with reference to step 206 of the process 200, calibration values may be filtered out of the initial calibration dataset based on whether the calibration metric for that calibration value indicates that it was derived using atmospheric pressure measurements made indoors and/or a confidence level of that indoor/outdoor determination.

In other embodiments, indoor calibration results can be identified and filtered from an initial calibration dataset to generate a filtered calibration dataset if those calibration results have confidence values of a magnitude similar to that of calibration values that were derived using indoor pressure data. For example, as shown in Table 500 of FIG. 5, the calibration confidence value associated with Calibration 2 (i.e., a value of 120 Pa) is significantly higher than the calibration confidence values associated with the other calibration values. Based on that large calibration confidence value, Calibration 2 may be filtered from the initial calibration dataset to generate a filtered calibration dataset. In such embodiments, with reference to step 204 of the process 200, a calibration metric for each calibration value of the initial calibration dataset may include a value indicating whether that calibration value was derived using atmospheric pressure measurements made indoors, or it may be the calibration confidence value itself. In such embodiments, with reference to step 206 of the process 200, calibration values may be filtered out of the initial calibration dataset based on whether the calibration metric for that calibration value, i.e., the calibration confidence value, is larger than a threshold value, or if the calibration confidence value deviates from a central tendency of the other calibration offset values of the initial calibration dataset beyond an acceptable level. For example, with reference to the table 500 of FIG. 5, Calibration 1 and Calibration 3-5 have calibration confidence values which range from 14.7 to 37.1. By comparison, the calibration confidence value of Calibration 2 is 120, which far exceeds the range of 14.7 to 37.1. Thus, in some embodiments, the threshold value/acceptable level is determined using the calibration offset and/or calibration confidence values of the initial calibration data set. For example, the threshold value/acceptable level may be representative of a 1-sigma or 2-sigma deviation from a central tendency or range of the calibration offset values and/or calibration confidence values of the initial calibration data set.

Erroneous Outdoor Data Filter

As disclosed above, the barometric air pressure sensor of a mobile device may be calibrated according to an estimated altitude relative to a known terrain height. In some embodiments, calibration data derived using atmospheric pressure measurements when the mobile device is underground (e.g., when the mobile device 120*b* is at Depth 1, as shown in FIG. 1) may be filtered from the initial calibration dataset based on certain criteria, such as GPS signal strength.

For example, as shown in FIG. 1, the signals 153 from the satellites 150 and/or the signals 113*a-c* from the transmitters 110*a-c* may not penetrate deep underground to Depth 1. Based on an absence of such signals, it may therefore be determined that the mobile device 120*b* is underground. However, above-ground data with erroneous 2D positions may not be identified in like fashion. For example, a reported indoor 2D position may or may not be accurate depending on the morphology of the terrain (i.e., suburban, urban, and rural) owing to 2D localization techniques. Therefore, some embodiments advantageously involve using an erroneous outdoor data filter disclosed herein to identify and filter out calibration values from the initial calibration dataset if they were derived at problematic indoor 2D locations.

As disclosed herein, the erroneous outdoor data filter detects calibration value outliers based on a score that is similar to a standard score, or Z-metric, and which represents a comparison between each calibration value of the initial calibration dataset (i.e., a calibration offset value and associated calibration confidence value) against all other calibration values of the initial calibration dataset.

A Z-metric, or Z-score, as is known in the art, is a numerical value that describes a value's relationship to a central tendency, such as a mean or median, and is measured in terms of standard deviations from the central tendency. If one calibration value is significantly numerically far from the other calibration values, then it may be advantageously filtered from the initial calibration dataset.

The Z-metric can be determined by dividing the calibration value difference by a calibration confidence value, and can be represented by the following equation:

$$Z\text{-metric} = \frac{CalCoeff - CalCoeff'}{CalConf} \quad \text{(Equation 2)}$$

where CalCoeff is the calibration offset value to check (i.e., a new calibration offset value), CalCoeff' is the calibration offset value to check against (i.e., a previous calibration offset value), and CalConf is a calibration confidence value of the new calibration offset value to check. Thus, the Z-metric is designed to measure the difference between a newly derived calibration value and a previously derived calibration value of the initial calibration dataset, scaled by the confidence value of the newly derived calibration value.

A large magnitude of Z-metric indicates that a new calibration value is significantly different than the previously derived calibration value. As described below, in some embodiments, determining a calibration metric for each calibration value of an initial calibration dataset involves determining a Z-metric for each calibration value of the initial calibration dataset (i.e., a calibration metric). Then, potentially erroneous calibration values are filtered from the initial calibration dataset by identifying a Z-metric threshold value and then comparing each of the calibration value Z-metrics to the Z-metric threshold value. In such embodiments, with reference to step 204 of the process 200, a calibration metric for each calibration value of the initial calibration dataset may include a value indicating a Z-metric for that calibration value. With reference to step 206 of the process 200, calibration values may be filtered out of the initial calibration dataset based on whether the calibration metric for that calibration value, i.e., the Z-metric, is larger than the Z-metric threshold value (e.g., 2).

In some embodiments, the Z-metric threshold value is determined using the Z-metric values of the initial calibration dataset. For example, in some embodiments, the Z-metric threshold value corresponds to a 1-sigma or 2-sigma deviation from a range or central tendency of the Z-metric values of the initial calibration dataset. In other embodiments, the Z-metric threshold value is empirically derived to achieve a tolerable amount of altitude error (e.g., based on design requirements). In still yet other embodiments, the Z-metric threshold value may correspond to a pre-determined amount of tolerable altitude error (e.g., corresponding to one floor of altitude error).

In other embodiments, as described below, a value derived using the Z-metrics may be used as the calibration metric. Such values are referred to herein as Z-metric derivatives. For example, in some embodiments, the calibration metric is a count of how many Z-metrics exceed the Z-metric threshold. In other embodiments, the calibration metric is an average or other central tendency of the Z-metrics.

Figure 6:
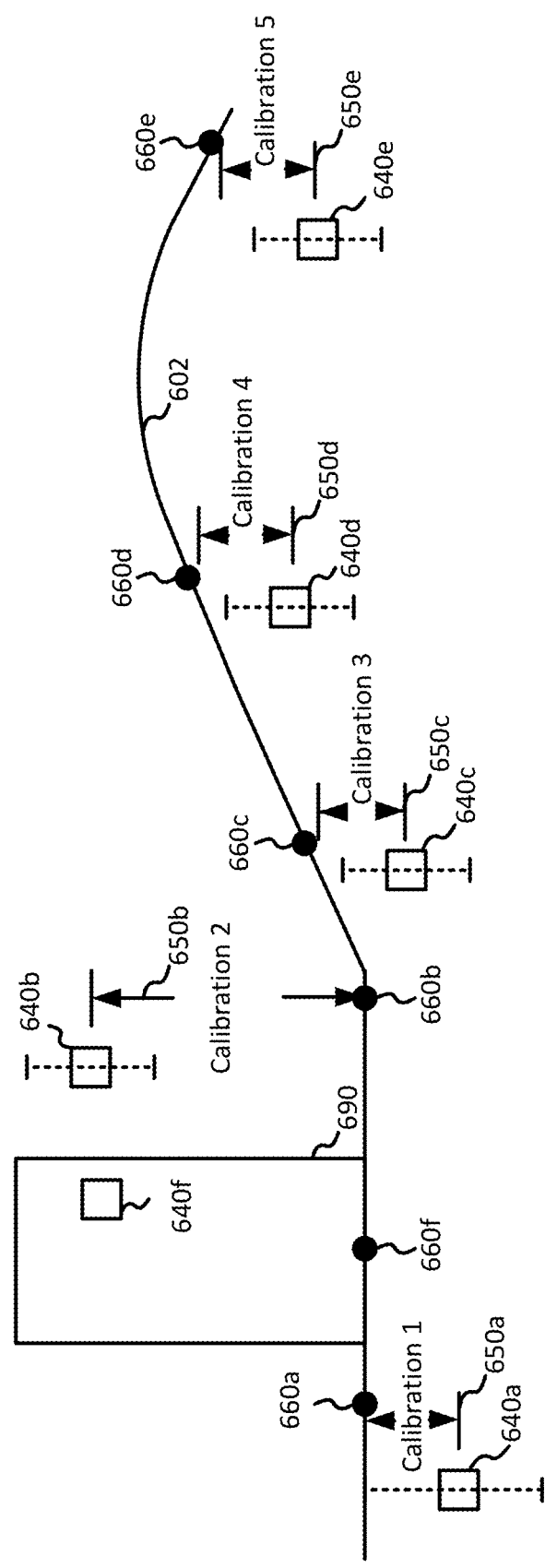
FIG. 6 is an example environment for identifying erroneous calibration values of a barometric air pressure sensor, in accordance with some embodiments.

FIG. 6 illustrates calibration values determined in an operational environment 600 which is similar to the operational environment 300 that was introduced in FIG. 3, in accordance with some embodiments. The operational environment 600 of FIG. 6, shown in profile, includes a terrain 602, a building 690, estimated 2D positions 660*a-e* of the mobile device (not shown) located at the terrain level, or vertically offset from the terrain level, an actual 2D position 660*f* of the mobile device, and calibration values 650*a-e* associated with each of the 2D positions 660*a-e*. Each of the calibration values 650*a-e* is shown as a vertical offset and is labeled as Calibration 1-5, respectively. Also shown are error bars 640*a-e* that are representative of respective calibration confidence values.

Figure 7:
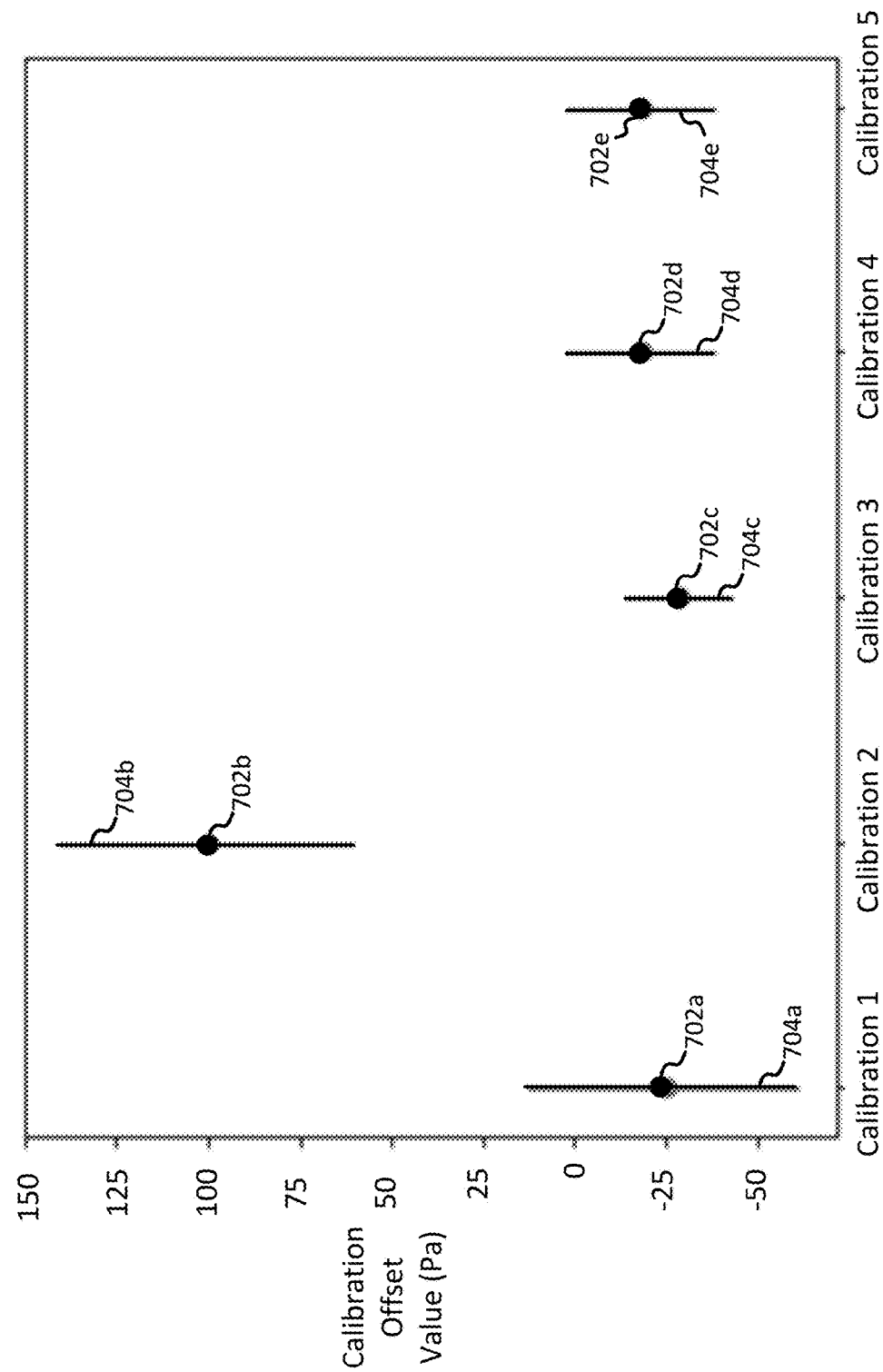
Figure 10:

Details of each of the calibration values 650*a-e* are illustrated in a graph 700 of FIG. 7 and a Table 800 of FIG. 8A. Z-metrics, and Z-metric derivatives, calculated using the calibration values 650*a-e* are illustrated in a Table 900 of FIG. 9A, Table 1000 of FIG. 10, and Table 1100 of FIG. 11.

The graph 700 of FIG. 7 includes further details of the calibration values 650*a-e* introduced in FIG. 6 and which are labeled Calibration 1-5. Each of the calibration values Calibration 1-5 has a respective calibration offset value 702*a-e* and a respective calibration confidence value 704*a-e*. Numerical values of the calibration offset values 602*a-e* and calibration confidence values 604*a-e* for the calibration values Calibration 1-5 are shown in Table 800 of FIG. 8A, all in Pa. Z-metric values calculated using Equation 2 for the calibration values Calibration 1-5 introduced in Table 800 are shown Table 900 of FIG. 9A. Examples of calibration metrics derived using the Z-metric values shown in Table 900 are shown in Table 1000 of FIG. 10 and Table 1100 of FIG. 11.

In some embodiments, a calibration value is defined as the height of the terrain minus an uncalibrated altitude of the mobile device. In such embodiments, example numerical values of the calibration offset values 602*a-e* and calibration confidence values 604*a-e* for the calibration values Calibration 1-5 are shown in Table 802 of FIG. 8B, all in Pa. Z-metric values calculated using Equation 2 for the calibration values Calibration 1-5 introduced in Table 802 are shown Table 902 of FIG. 9B.

As described above, in some embodiments, a larger calibration confidence value (i.e., a higher amount of anticipated error) is assigned (e.g., by a calibration system) to calibration values derived using atmospheric pressure measurements made when a mobile device is assumed to be indoors as compared to a calibration confidence value assigned to calibration values derived using pressure measurements made when the mobile device is assumed to be outdoors. This is because there is an increased uncertainty in the actual altitude of the mobile device when it is on a higher floor of a building, as well as because localized atmospheric effects within a building such as stack effect and/or HVAC effects may cause anomalous atmospheric pressure measurements. However, if a mobile device that is actually outdoors is incorrectly assumed to be indoors because of an inaccurate 2D position estimate, an unnecessarily large calibration confidence value may be assigned by the calibration system to a calibration value derived for that mobile device.

Similarly, in some scenarios, a mobile device that is actually outdoors may incorrectly determined to be indoors. In use cases where a calibration offset value is defined as an uncalibrated altitude of a mobile device minus the height of the terrain at the estimated 2D position of the mobile device (or the height of the terrain plus a vertical offset), then an erroneous calibration value derived assuming a problematic indoor location will be larger than it would have been at the correct, outdoor, 2D position, assuming the mobile device was above the ground.

When the mobile device reports an erroneous outdoor 2D location 660*b* as shown in FIG. 6, the calibration confidence value may be within a reasonable range although it is still erroneous. That is, the confidence value assigned by the calibration system to the calibration value at the problematic outdoor location will be comparatively small due to it being assumed to be outdoors. Therefore, if the Z-metric of a calibration value is large and positive, it may indicate that indoor data was incorrectly characterized as outdoor data and thus the calibration value should be filtered from the initial calibration dataset to generate the filtered dataset. In such embodiments, with reference to step 204 of the process 200, the calibration for each calibration value of the initial calibration dataset is a Z-metric generated using that calibration value. With reference to step 206 of the process 200, the calibration values are filtered out of the initial calibration dataset if the Z-metric for that calibration value is greater than a Z-metric threshold value (e.g., 2).

In some embodiments, the Z-metric threshold value is determined using the Z-metric values of the initial calibration dataset. For example, in some embodiments, the Z-metric threshold value corresponds to a 1-sigma or 2-sigma deviation from a range or central tendency of the Z-metric values of the initial calibration dataset. In other embodiments, the Z-metric threshold value is empirically derived to achieve a tolerable amount of altitude error (e.g., based on design requirements). In still yet other embodiments, the Z-metric threshold value may correspond to a pre-determined amount of tolerable altitude error (e.g., corresponding to one floor of altitude error).

Alternatively, in use cases where a calibration value is defined as the height of the terrain at the estimated 2D position of the mobile device (or the height of the terrain plus a vertical offset) minus an uncalibrated altitude of the mobile device, a negative Z-metric may indicate that indoor data was incorrectly used as outdoor data and thus the calibration value should be filtered from the initial calibration dataset to generate the filtered calibration dataset. In such embodiments, with reference to step 204 of the process 200, the calibration for each calibration value of the initial calibration dataset is a Z-metric generated using that calibration value. With reference to step 206 of the process 200, the calibration values are filtered out of the initial calibration dataset if the Z-metric for that calibration value is less than a Z-metric threshold value.

In some embodiments, the Z-metric threshold value is determined using the Z-metric values of the initial calibration dataset. For example, in some embodiments, the Z-metric threshold value corresponds to a 1-sigma or 2-sigma deviation from a range or central tendency of the Z-metric values of the initial calibration dataset. In other embodiments, the Z-metric threshold value is empirically derived to achieve a tolerable amount of altitude error (e.g., based on design requirements). In still yet other embodiments, the Z-metric threshold value may correspond to a pre-determined amount of tolerable altitude error (e.g., corresponding to one floor of altitude error).

Figure 12:
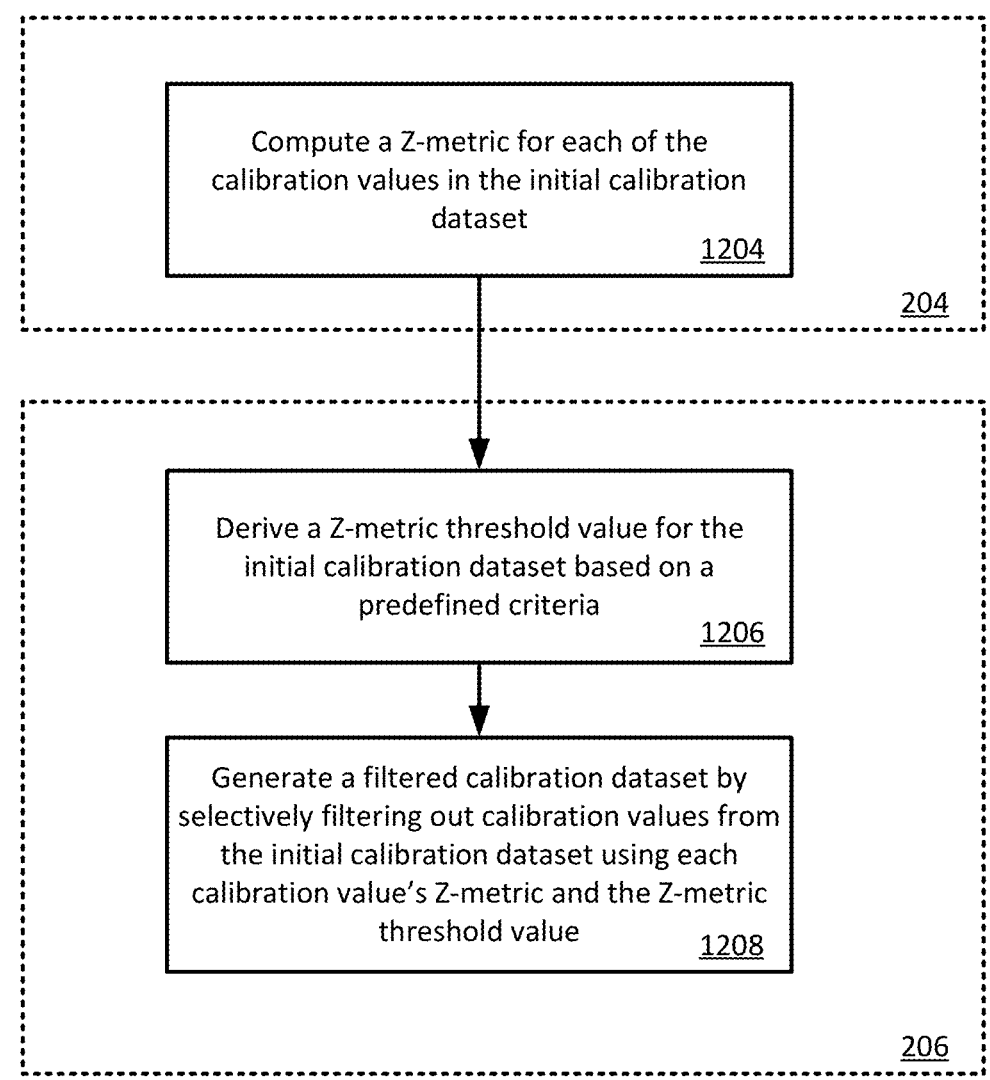
FIG. 12 is an example portion of the process shown in FIG. 2 for identifying erroneous calibration values of a barometric air pressure sensor, in accordance with some embodiments.

An example process 1200 for determining which calibration values should be filtered out of an initial calibration dataset based on Z-metric values is shown in FIG. 12, in accordance with some embodiments. The particular steps, order of steps, and combination of steps are shown for illustrative and explanatory purposes only. Other embodiments can implement different particular steps, orders of steps, and combinations of steps to achieve similar functions or results. Step 1204 is an example embodiment of step 204 of the process 200. Steps 1206 and 1208 are an example embodiment of step 206 of the process 200.

At step 1204, a Z-metric value is computed for each of the calibration values of the initial calibration dataset using Equation 2. The calibration values of the initial calibration dataset include calibration offset values and calibration confidence values derived using atmospheric pressure measurements made at multiple locations by the mobile device.

Examples of calculated Z-metrics using the calibration values Calibration 1-5 (650a-e) shown in FIG. 6 are shown in Table 900 of FIG. 9A.

At step 1206, a Z-metric threshold is derived based on a predefined criteria. For example, in some embodiments, the Z-metric threshold criteria may be based on a requirement of a building floor number threshold, a design requirement, or based on empirical results. For example, in some embodiment, the Z-metric threshold could be defined to filter out any erroneous calibration values from the calibration dataset that exceed a certain building floor number. In some embodiments, the Z-metric threshold value is determined using the Z-metric values of the initial calibration dataset. For example, in some embodiments, the Z-metric threshold value corresponds to a 1-sigma or 2-sigma deviation from a range or central tendency of the Z-metric values of the initial calibration dataset. In other embodiments, the Z-metric threshold value is empirically derived to achieve a tolerable amount of altitude error (e.g., based on design requirements). In still yet other embodiments, the Z-metric threshold value may correspond to a pre-determined amount of tolerable altitude error (e.g., corresponding to one floor of altitude error).

In one example, the requirement of a building floor number that is selected as a Z-metric threshold corresponds to a one floor altitude difference, which is about 3 meters, or about 30 Pa in terms of measured pressure by the mobile device (assuming standard pressure and temperature). The calibration confidence values of the calibration values Calibration 1-5 determined in the operational environment 600 range from 14.7 Pa to 40 Pa, as shown in the Table 800 of FIG. 8A. Based on experimental results from field data, in some embodiments, a typical "good" calibration confidence is about 15 Pa. Given such results, in some embodiments the Z-metric threshold may therefore be derived to have a value of 2 based on dividing the value of 30 Pa, corresponding to one floor of altitude, by 15 Pa. In embodiments in which a calibration value is defined as the height of the terrain minus an uncalibrated altitude of the mobile device, as shown in FIG. 8B and FIG. 9B, the example Z-metric threshold may therefore be derived to have a value of −2 and values which are less than the Z-metric threshold should be filtered out from the initial calibration dataset.

At step 1208, a filtered calibration dataset is generated by selectively filtering out calibration values from the initial calibration dataset using each calibration value's Z-metric and the derived Z-metric threshold value. For example, if the Z-metric associated with a calibration value exceeds the Z-metric threshold value, that calibration value is filtered out of the initial calibration dataset.

In some embodiments, the calibration metric used to filter the initial calibration dataset is a combined calibration metric which could be a maximum, minimum, or average of all the individual Z-metrics, or it could be a count of how many individual Z-metrics exceed the threshold value. In such embodiments, a Z-metric threshold may be the maximum count value (e.g., 2, 3, 4, all, or a percentage). For example, as shown in the Table 900 of FIG. 9A and Table 1000 of FIG. 10, all four Z-metrics of the calibration value Calibration 2 (i.e., 3.12, 3.22, 2.97, and 2.97) exceed the threshold value of 2 that was defined in the previous step. Therefore, the calibration value Calibration 2 should be filtered from the initial calibration dataset to generate the filtered calibration dataset.

Figure 11:

Alternatively, as shown in Table 1100 of FIG. 11, the average of the individual Z-metrics could be compared to the threshold value. For example, as shown in the Table 1100, the averaged Z-metric of Calibration 2 (3.07) exceeds the Z-metric threshold value of 2, and therefore the calibration value Calibration 2 should be filtered from the calibration dataset.

As an alternative to determining if the calibration metric of a calibration value (e.g., the Z-metric) simply exceeds the threshold value (e.g., the Z-metric threshold value), as described above, in some embodiments it is determined if the calibration metric exceeds the threshold value AND has an opposite sign. The first embodiment for determining if the calibration metric of a calibration value exceeds the threshold value as described above can be performed for calibrations that are far apart from each other in magnitude, but if one or more of the calibrations had a poor calibration (i.e., the confidence value is very large), then an additional modification may be required so as to not mistakenly discard a good calibration value.

Figure 13:
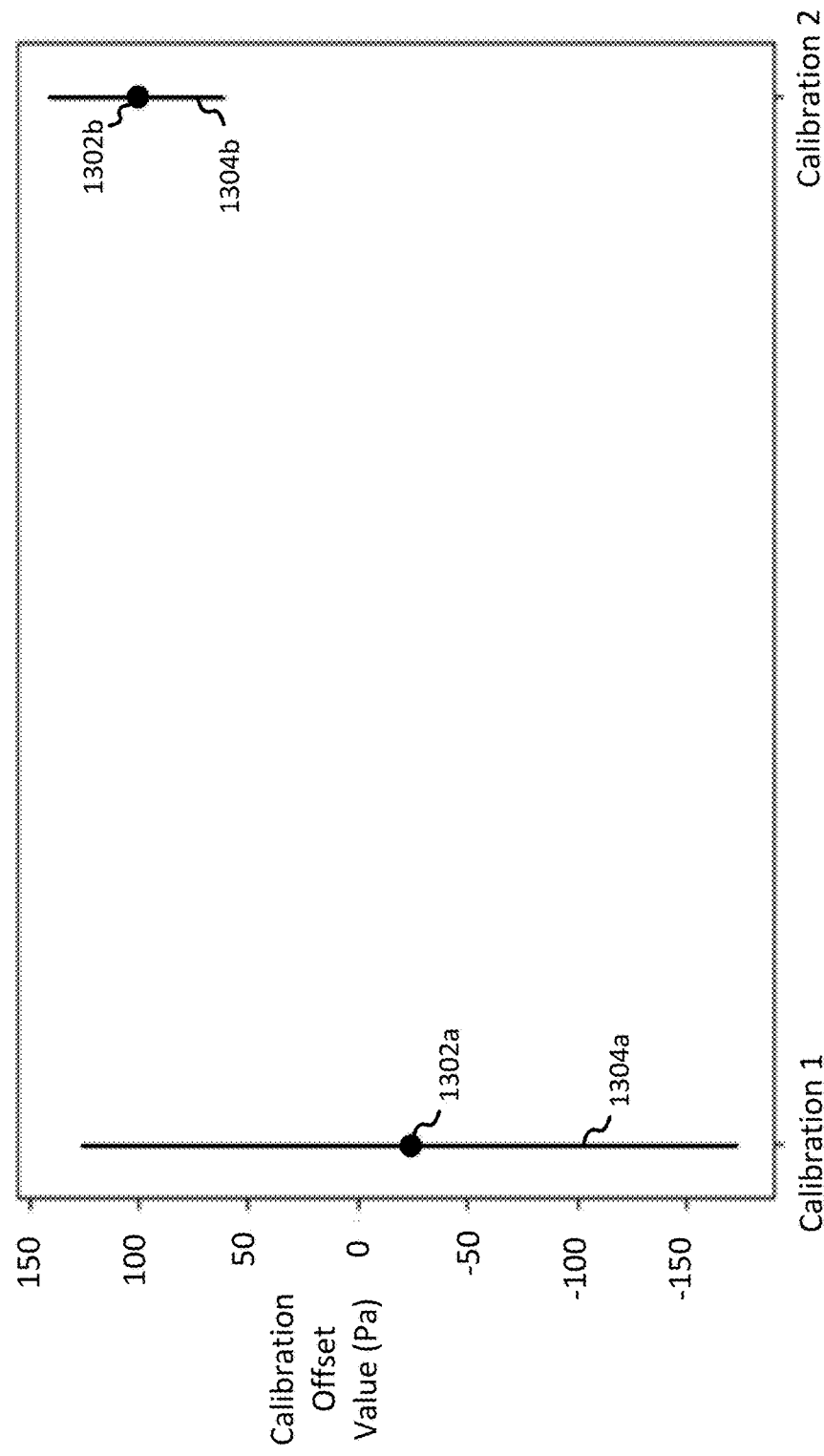

For example, FIG. 13 includes a graph 1300 of calibration values labeled Calibration 1-2, each having a respective calibration offset value 1302a-b and a respective calibration confidence value 1304a-b. Numerical values of the calibration offset values 1302a-b and calibration confidence values 1304a-b for the calibration values Calibration 1-2 are shown in the Table 1400 of FIG. 14, all in Pa. In some embodiments, the Table 1400 is a simplified example of an initial calibration dataset (i.e., a calibration dataset that has not yet been filtered). Z-metric values calculated using Equation 2 for the calibration values Calibration 1-2 introduced in Table 1400 are shown in Table 1500 of FIG. 15.

As shown in the graph 1300 of FIG. 13 and detailed as numerical values in Table 1400 of FIG. 14, a calibration confidence value of Calibration 1 (i.e., 150 Pa) is significantly higher than a calibration confidence value of Calibration 2 (i.e., 40 Pa). If the Z-metric of Calibration 2 versus that of Calibration 1 is calculated, as shown in Table 1500 of FIG. 15, then Calibration 2 may be filtered out from the calibration dataset since the Z-metric is 3.12 and is, therefore, greater than the previously defined Z-metric threshold of 2. However, Calibration 1 may have been collected in error, as indicated by the large confidence value of 150 Pa (i.e., indicating a low certainty) shown in Table 1400 of FIG. 14, and may therefore be unreliable.

In order to not incorrectly filter Calibration 2 from the calibration dataset, the Z-metrics of Calibration 1 are compared to those of Calibration 2 and vice versa. In the example shown in the table 1500 of FIG. 15, Calibration 1 as compared to Calibration 2 has a Z-metric of −0.832. Calibration 2 as compared to Calibration 1 has a Z-metric of 3.12. If the Z-metric threshold were plus or minus 3, Calibration 2 would only be filtered from the calibration dataset if the Z-metric for Calibration 1 vs. Calibration 2 were less than −3 AND if the Z-metric for Calibration 2 vs. Calibration 1 were greater than 3. Because only one of these criteria is met (i.e., −0.832 is not less than −3), Calibration 2 is advantageously not filtered from the initial calibration dataset.

Combination of the Erroneous Outdoor Data Filter and Other Information

Figure 17:
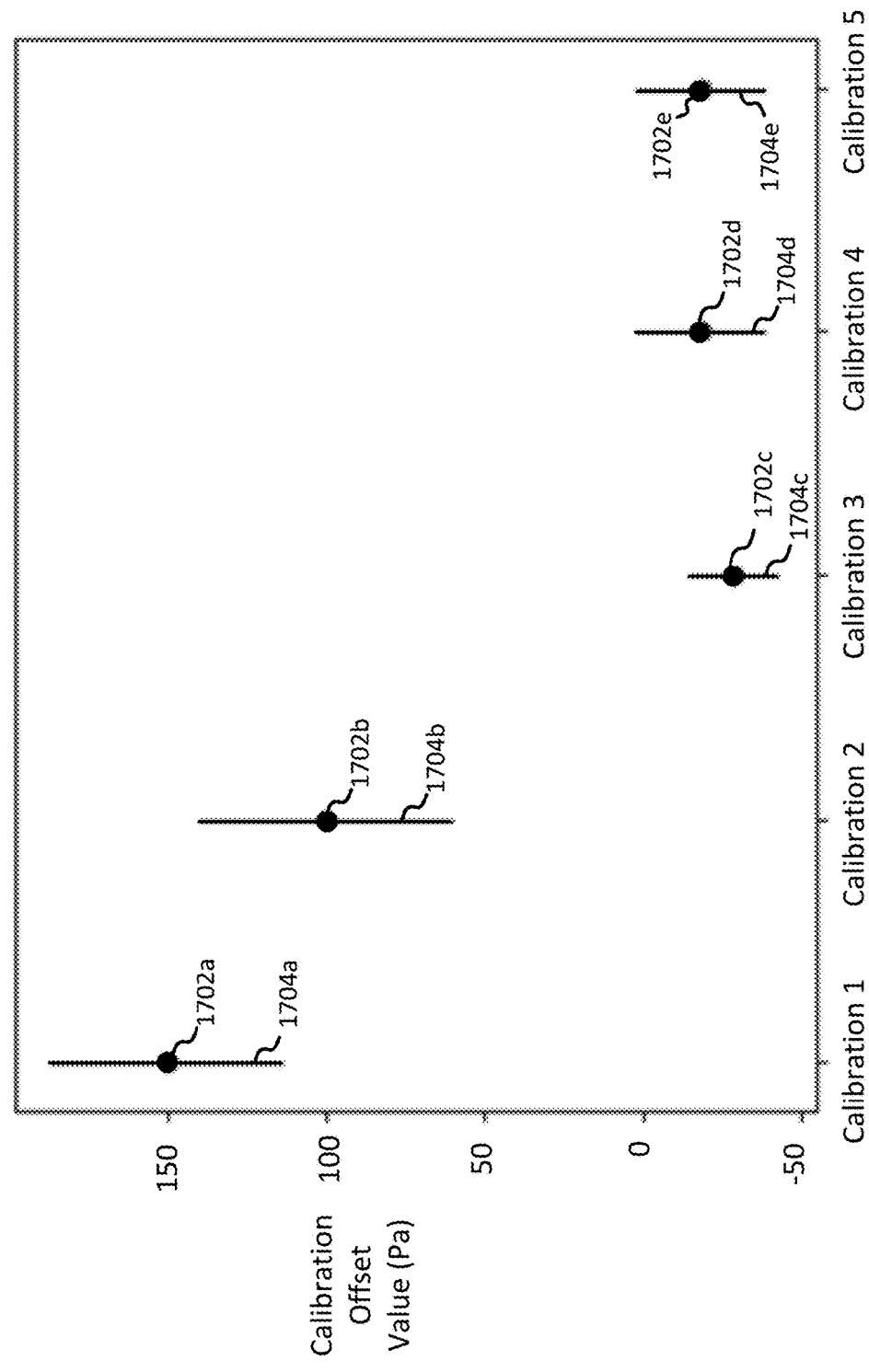

It is also possible that such filtering cannot be determined by just considering the Z-metrics, and therefore additional information is needed. For example, numerical values of initial calibration values Calibration 1-5 are shown in a Table 1600 of FIG. 16 and are illustrated in a graph 1700 shown in FIG. 17. The calibration values Calibration 1-5 shown in the graph 1700 each include a respective calibration offset value 1702a-e and a respective calibration confidence value 1704a-e. Z-metrics calculated using equation 2 for the calibration values Calibration 1-5 are shown a Table 1800 of FIG. 18. Z-metric derivatives, calculated using the calibration values Calibration 1-5 are illustrated in a Table 1900 of FIG. 19.

As shown in the Table 1600, the calibration offset values for Calibration 1 and Calibration 2 are noticeably higher than the calibration values of Calibration 3, Calibration 4, and Calibration 5. As shown in the Table 1800 of FIG. 18 and the Table 1900 of FIG. 19, if the calibration metric used to filter the initial calibration dataset is based on the number of Z-metrics which exceed a defined Z-metric threshold of 2, then both calibration values Calibration 1 and Calibration 2 have three out of four Z-metrics which are beyond that threshold value. However, because not all four of the Z-metric values of Calibration 1 and Calibration 2 exceed the threshold value of 2, it is less obvious to tell if these calibration values should be filtered from the initial calibration dataset.

Thus, in some embodiments, additional information in combination with the erroneous outdoor data filter may be needed to make a decision. For example, 2D building footprints retrieved from a building database may be used to identify if the mobile device is likely inside a building and therefore identify whether the calibration values Calibration 1 and Calibration 2 from the Table 1600 of FIG. 16 were likely derived while the mobile device was above ground level indoors.

In such embodiments, with reference to step 204 of the process 200, a calibration metric for each calibration value of the initial calibration dataset may be representative of a positional relationship between the mobile device and a building footprint for when the pressure data was measured by the mobile device. The calibration metric may also include another value that represents a confidence level of the indoor/outdoor determination.

In such embodiments, with reference to step 206 of the process 200, calibration values may be filtered out of the initial calibration dataset based on whether the calibration metric for that calibration value indicates that the calibration value was derived using a pressure measurement that was made when the mobile device was within a threshold range of the building footprint. Examples of such positional relationships are illustrated in FIG. 20 through FIG. 22.

Figure 20:
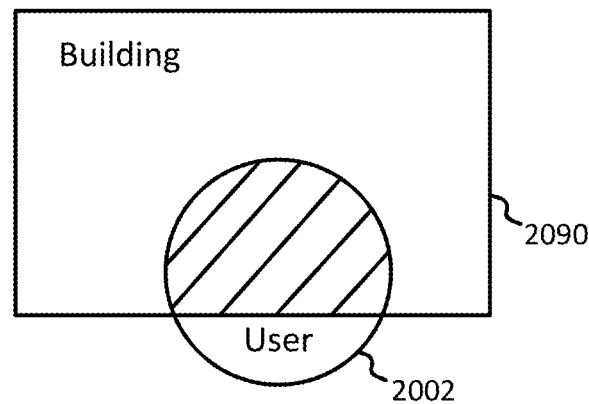
FIGS. 20-22 illustrate positional relationships between a mobile device and a building footprint in an operational environment, in accordance with some embodiments.

FIG. 20 shows a simplified orthoscopic view 2000 of a positional relationship between an estimated 2D position area 2002 of a mobile device ("User") and a building footprint 2090. FIG. 21 shows a simplified orthoscopic view 2100 of a positional relationship between an estimated 2D position area 2102 of a mobile device ("User") and a building 2190, as well as a centroid measurement 2104. FIG. 22 shows a simplified orthoscopic view 2200 of a positional relationship between an estimated 2D position area 2202 of a mobile device ("User") and a building footprint 2290, as well as a nearest distance measurement 2204.

A first positional relationship between a mobile device and a building footprint is illustrated in FIG. 20. For a given calibration value, if an estimated 2D position area 2002 of the mobile device overlaps with a building footprint 2090 by more than a threshold value (for example 50%) when that calibration value was generated, then that calibration value was possibly obtained using atmospheric pressure data that was obtained while the mobile device was indoors, and was above a ground floor. Therefore, the associated calibration value could be filtered from the initial calibration dataset to generate a filtered calibration dataset.

Figure 21:
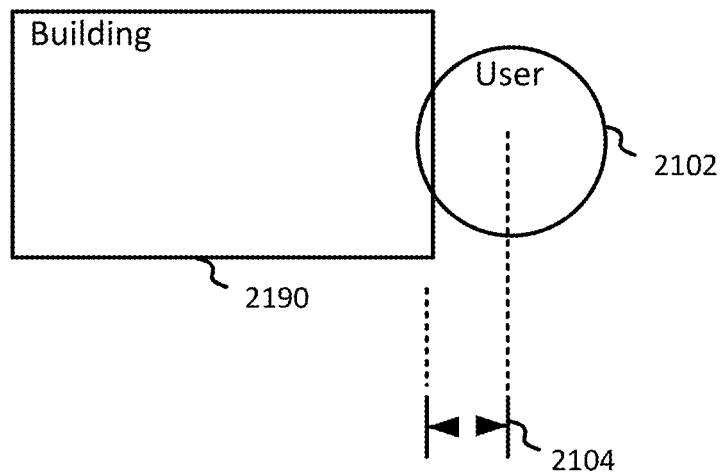
Figure 22:
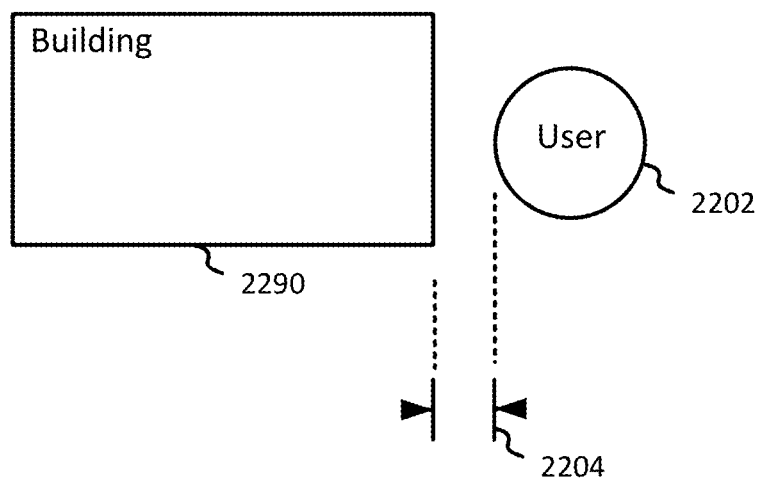

A second positional relationship between a mobile device and a building footprint is illustrated in FIG. 21. If a centroid measurement 2104 of an estimated 2D position area 2102 of the mobile device is less than a given threshold distance to an outer perimeter of a building 2190 (e.g., 10 m), the associated calibration value might have been derived when the mobile device was indoors. Therefore, the associated calibration value could be filtered from the initial calibration dataset to generate a filtered calibration dataset.

A third positional relationship between a mobile device and a building footprint is illustrated in FIG. 22. If a nearest distance measurement 2204 of an estimated 2D position area 2202 of the mobile device is within a given threshold distance to an outer perimeter of a building footprint 2290 (e.g. 5 m), then that calibration value was possibly obtained using atmospheric pressure data that was obtained while the mobile device was indoors, and was above a ground floor. Therefore, the associated calibration value could be filtered from the initial calibration dataset to generate a filtered calibration dataset.

In some embodiments, if the mobile device was determined to be indoors in any or all of the three positional relationship scenarios described above, then each associated Z-metric may be weighted differently as compared to Z-metrics associated with calibration values derived when the mobile device was not determined to be indoors. In such embodiments, if the number of Z-metrics exceeding a threshold is averaged or summed, indoor Z-metrics can be weighted one way and non-indoor Z-metrics can be weighted a different way to attenuate the contribution made by the indoor Z-metric values to a final value. For example, in Table 1900 of FIG. 19, Calibration 1 may instead have a value of 1, and Calibration 2 may have a value of 2, instead of 3 for both, and a new conclusion can be reached with this additional information.

Checking Against the Recent Calibration History

For a mobile device that already has a calibration history available (e.g., at a memory device of the mobile device and/or at a remote server), a new calibration value of the initial calibration dataset may be compared against previous calibration results to determine whether that calibration value should be filtered out of the initial calibration dataset. The difference between the new calibration value and the previous calibration values should ideally not be too large since normal sensor drift should be within a threshold for a certain time period (for example, 10 Pa per day). Therefore, a history check essentially checks the consistency between the new calibration values and the previous calibration values.

One way of measuring calibration value consistency is to measure an "overlap ratio" between the new calibration range and a previous calibration range. In such embodiments, with reference to step 204 of the process 200, a calibration metric for each calibration value of the initial calibration dataset may include a value indicating an overlap ratio between a new calibration value as compared to previous calibration values of the initial calibration dataset. In such embodiments, with reference to step 206 of the process 200, calibration values may be filtered out of the initial calibration dataset by comparing that calibration metric to an overlap ratio threshold (e.g., 80%).

In this context, a calibration range is defined as a calibration offset value, plus or minus the associated calibration confidence value. The overlap ratio is defined as:

$$\text{overlap ratio} = \frac{\text{(overlap between new and previous calibration range)}}{\text{(previous calibration range)}} \quad \text{(Equation 3)}$$

If the overlap ratio is beyond a certain threshold (for example, 80%), the new calibration value is consistent with the previous calibration values and therefore should not be filtered from the initial calibration dataset.

Figure 23:
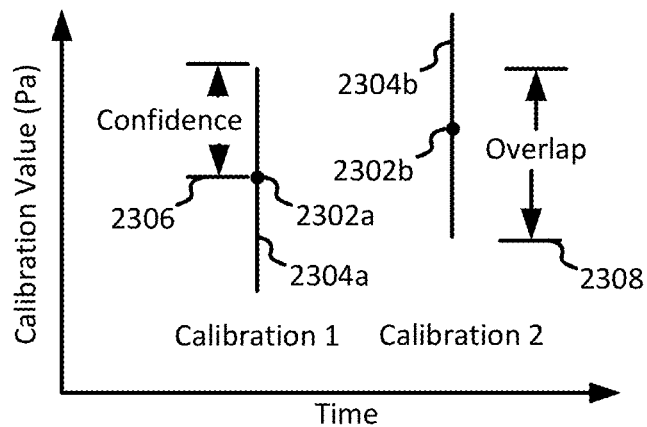
FIGS. 23-26 illustrate calibration values determined in an operational environment, in accordance with some embodiments.

FIG. 23 includes a graph 2300 of first example calibration values labeled Calibration 1 and Calibration 2. Each of the calibration values Calibration 1-2 has a respective calibration offset value 2302a-b and a respective calibration confidence value 2304a-b. Also shown is a confidence interval 2306 and an overlap 2308.

Figure 24:
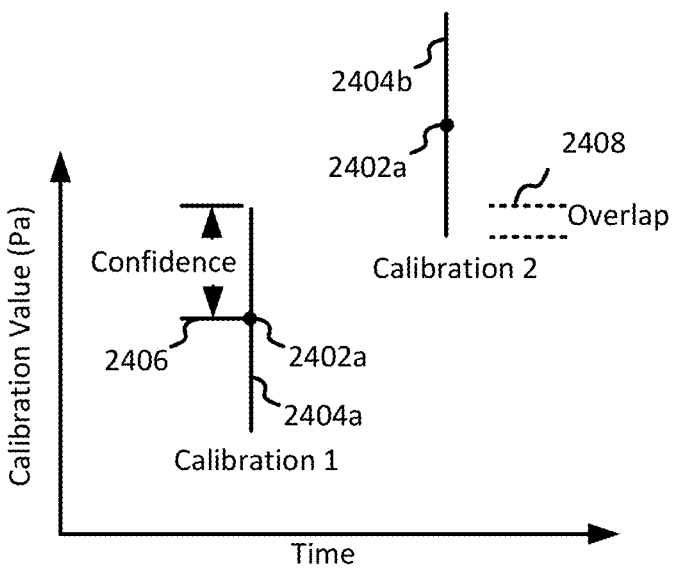

FIG. 24 includes a graph 2400 of second example calibration values labeled Calibration 1 and Calibration 2. Each of the calibration values Calibration 1-2 have a respective calibration offset value 2402a-b and a respective calibration confidence value 2404a-b. Also shown is a confidence interval 2406 and an overlap 2408.

In the graph 2300 of FIG. 23, an overlap 2308 between calibration value Calibration 1 and calibration value Calibration 2 is over 80% of Calibration 1. Therefore, the calibration value Calibration 2 passes the history check and thus should not be filtered from the initial calibration dataset. By comparison, as shown in the graph 2400 of FIG. 24, calibration value Calibration 2 has changed so much that an overlap 2408 between calibration values Calibration 1 and Calibration 2 is smaller than a threshold level. In such scenarios, calibration value Calibration 2 fails in the history check and should be filtered out of the initial calibration dataset.

Aging Confidence Levels of Historic Calibration Values

In some embodiments, the confidence value of the previous calibration value may be "aged" (i.e., increased) according to an amount of time that has gone by since the calibration value was derived. The aging speed (i.e., a rate of increase) may be different for different types of sensors, or it could be periodic and/or fluctuating.

Figure 25:
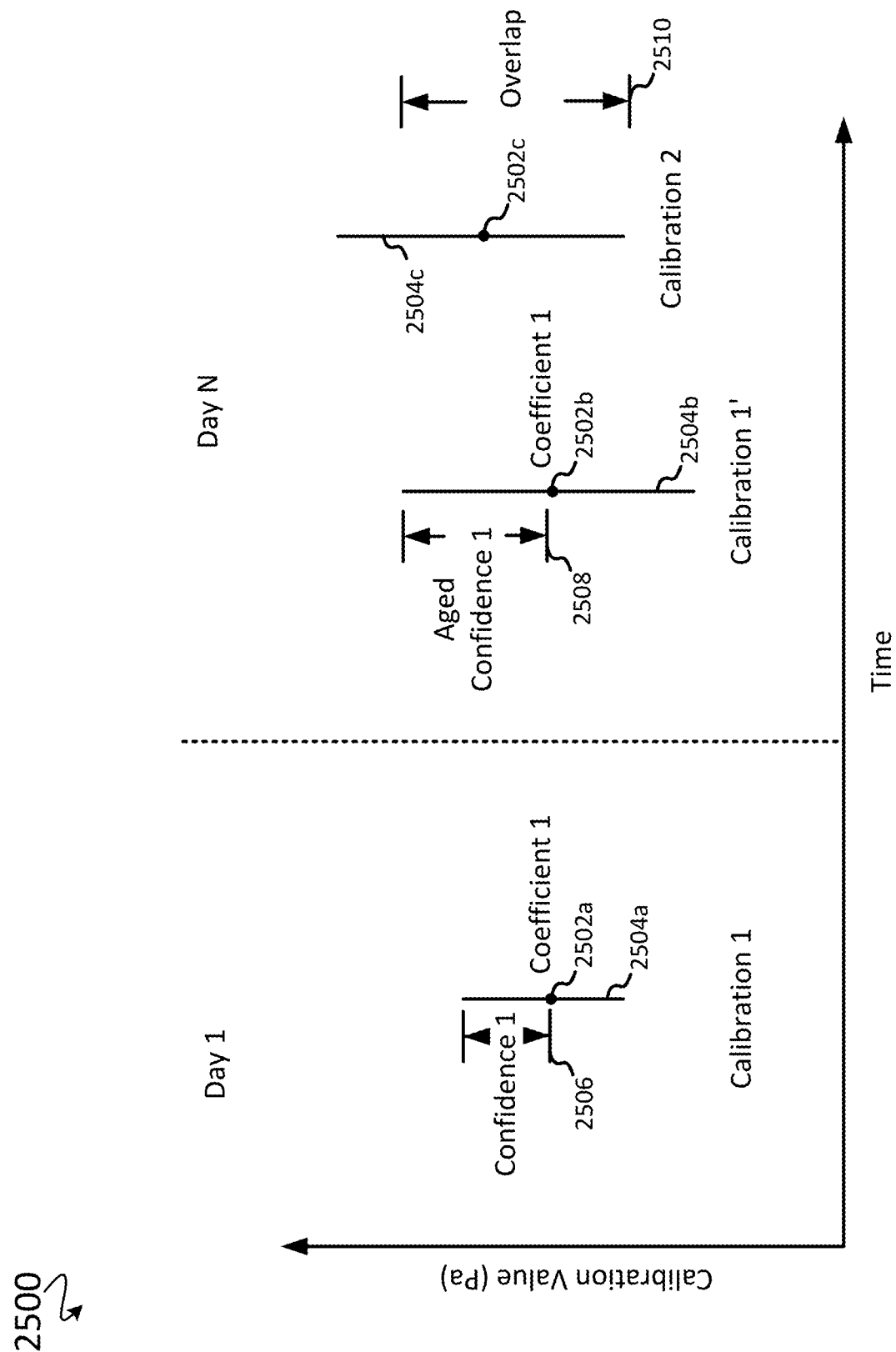

To illustrate this concept, FIG. 25 includes a graph 2500 of an initial calibration value labeled Calibration 1, an aged calibration value Calibration 1', and a calibration value Calibration 2. Each of the calibration values has a respective calibration offset value 2502a-c and a respective calibration confidence value 2504a-c. Also shown is a confidence interval 2506, an aged confidence interval 2508, and an overlap 2510.

The graph 2500 shows that on Day 1 when calibration value Calibration 1 was derived, the original confidence value 2506 had a value of Confidence 1. On Day N, when calibration value Calibration 2 was derived and compared to calibration value Calibration 1, the confidence value Confidence 1 should be "aged" (i.e., increased) to create "Aged Confidence 1" before being used in the overlap comparison.

Checking Against the Larger Calibration History of the Pressure Sensor

Similar to comparing recent calibration values to historic calibration values within an initial calibration dataset as described above, a comparison can be extended from the recent previous calibration to a larger history of calibration (e.g., up to and including an entire calibration history of the pressure sensor). Again, this check is essentially checking the consistency of the new calibration values.

Figure 26:
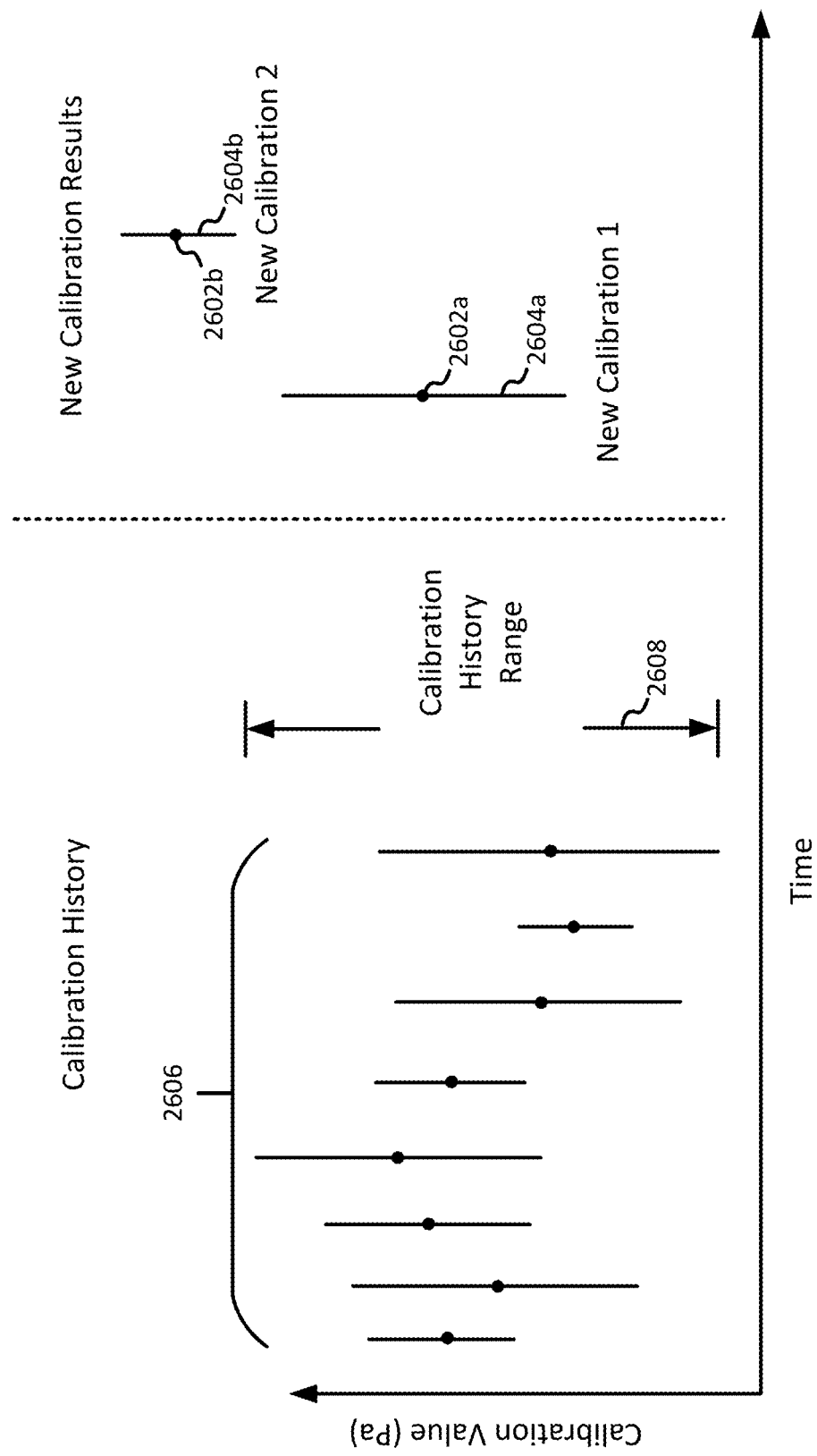

To illustrate this concept, FIG. 26 includes a graph 2600 includes a set of historical calibration values 2606, a calibration history range 2608 of the historical calibration values, a first recent calibration value labeled New Calibration 1 having a calibration offset value 2602a and a calibration confidence value 2604a, and a second recent calibration value labeled New Calibration 2 having a calibration offset value 2602b and a calibration confidence level 2604b.

As illustrated in the graph 2600, the recent calibration results Calibration 1 and Calibration 2 may be compared to the entire calibration history 2606 for that mobile device. As shown, the calibration offset value 2602a largely overlaps with the value range 2608 of the previous calibration history 2606 and should therefore not be filtered from the initial calibration dataset. However, the calibration offset value 2602b is completely outside the value range 2608 of a previous calibration history 2606, which indicates that this value was possibly derived using a problematic indoor 2D position and should be filtered from the calibration dataset.

As described above, in some embodiments, the confidence values of the previous calibration values may be "aged" (i.e., increased) according to an amount of time that has gone by since the calibration value was derived. The aging speed (i.e., a rate of increase) may be different for different types of sensors, or it could be periodic and/or fluctuating.

Peer-to-Peer Comparison Against an Accurate Device Nearby

If an uncalibrated mobile device is located at the same position, or within a threshold distance, of an accurate device that is known to have an accurate calibration, a recent calibration, or that has a high-quality sensor that doesn't need calibration, the calibrated altitude reported by the mobile device can be compared against that of the accurate device to determine a calibration metric. In such embodiments, a calibration metric may be a difference between a measured pressure or estimated altitude of a mobile device and a corresponding measured pressure or estimated altitude derived using the known good barometric air pressure sensor that is within the threshold distance from the mobile device. Calibration values may be filtered from the initial calibration dataset based on that difference or based on a subsequently determined pressure or altitude difference after the mobile device has been calibrated using the known good barometric air pressure sensor. For example, if a mobile device is measured to be within 10 m of an accurate device in a flat area, an altitude measurement from the accurate device may be used to derive a calibration value for the mobile device. After applying the calibration value to a pressure measurement or altitude estimate of the mobile device, if the reported estimated altitude or pressure of the mobile device is still different from that of the accurate device by more than a threshold amount (for example, 3 m or 30 Pa), the calibration result is likely to be erroneous and should be filtered from the initial calibration dataset.

Filtering Out Calibration Values that are Derived by "Driving" Data

As stated above, HVAC pressurization of a vehicle could contribute to an erroneous calibration value if pressure measurements made when the mobile device was inside the vehicle are used in generating the calibration values. In some embodiments, a mobile device is assumed to be inside of a vehicle if a 2D position of the mobile device overlaps that of a road, and/or if an activity context of the mobile device involves driving. In such embodiments, a calibration metric includes an indication of whether a particular calibration value is associated with pressure data that was measured when a mobile device was inside of a vehicle. If it is determined that the mobile device is, or was, inside of a vehicle, any associated calibration values could be filtered out of the initial calibration dataset.

Figure 27:
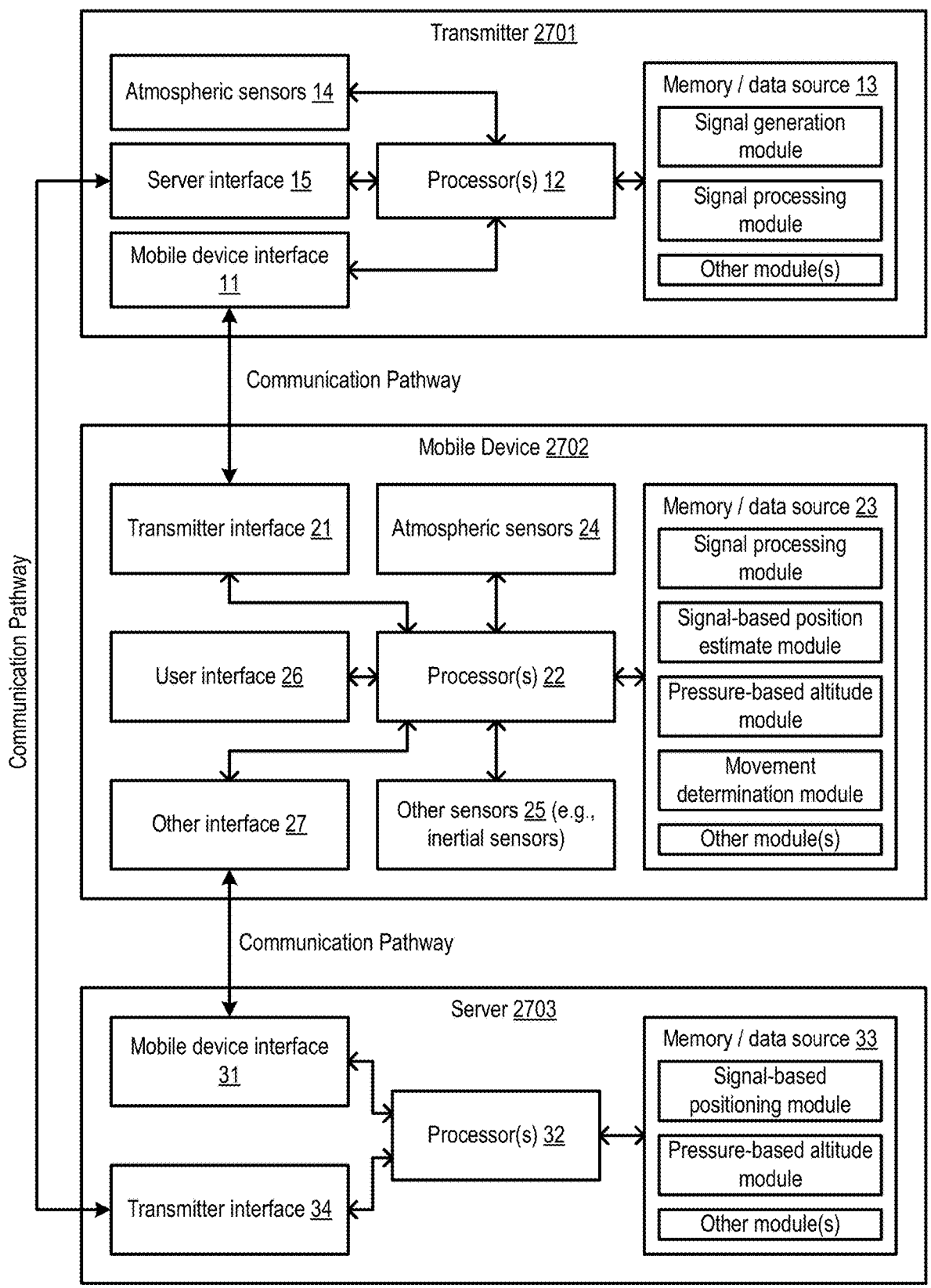
FIG. 27 illustrates components of a transmitter, a mobile device, and a server, in accordance with some embodiments.

FIG. 27 illustrates components of an example transmitter 2701 (e.g., one of the transmitters 110*a-c*), an example mobile device 2702 (e.g., one of the mobile devices 120*a-c*), and an example server 2703 (e.g., any one of the servers 130). Examples of communication pathways are shown by arrows between components. The components shown in FIG. 27 are operable to perform all or a portion of the process 200.

By way of example in FIG. 27, each of the transmitters 2701 may include: a mobile device interface 11 for exchanging information with a mobile device (e.g., antenna(s) and RF front-end components known in the art or otherwise disclosed herein); one or more processor(s) 12; memory/data source 13 for providing storage and retrieval of information and/or program instructions; atmospheric sensor(s) 14 for measuring environmental conditions (e.g., pressure, temperature, humidity, other) at or near the transmitter; a server interface 15 for exchanging information with a server (e.g., an antenna, a network interface, or other); and any other components known to one of ordinary skill in the art. The memory/data source 13 may include a memory storing software modules with executable instructions, and the processor(s) 12 may perform different actions by executing the instructions from the modules, including (i) performance of a part or all of the methods as described herein or otherwise understood by one of skill in the art as being performable at the transmitter; (ii) generation of positioning signals for transmission using a selected time, frequency, code, and/or phase; (iii) processing of signals received from the mobile device or another source; or (iv) other processing as required by operations described in this disclosure. Signals generated and transmitted by a transmitter may carry different information that, once determined by a mobile device or a server, may identify the following: the transmitter; the transmitter's position; environmental conditions at or near the transmitter; and/or other information known in the art. The atmospheric sensor(s) 14 may be integral with the transmitter, or separate from the transmitter and either co-located with the transmitter or located in the vicinity of the transmitter (e.g., within a threshold amount of distance).

By way of example in FIG. 27, the mobile device 2702 may include: a transmitter interface 21 for exchanging information with a transmitter (e.g., an antenna and RF front end components known in the art or otherwise disclosed herein); one or more processor(s) 22; memory/data source 23 for providing storage and retrieval of information and/or program instructions; atmospheric sensor(s) 24 (such as barometers and temperature sensors) for measuring environmental conditions (e.g., pressure, temperature, other) at the mobile device; other sensor(s) 25 for measuring other conditions (e.g., inertial sensors for measuring movement and orientation); a user interface 26 (e.g., display, keyboard, microphone, speaker, other) for permitting a user to provide inputs and receive outputs; another interface 27 for exchanging information with the server or other devices external to the mobile device (e.g., an antenna, a network interface, or other); and any other components known to one of ordinary skill in the art. A GNSS interface and processing unit (not shown) are contemplated, which may be integrated with other components (e.g., the interface 21 and the processors 22) or a standalone antenna, RF front end, and processors dedicated to receiving and processing GNSS signaling. The memory/data source 23 may include a memory (e.g., a data storage module) storing software modules with executable instructions, and the processor(s) 22 may perform different actions by executing the instructions from the modules, including (i) performance of a part or all of the methods as described herein or otherwise understood by one of ordinary skill in the art as being performable at the mobile device; (ii) estimation of an altitude of the mobile device based on measurements of pressure from the mobile device and transmitter(s), temperature measurement(s) from the transmitter(s) or another source, and any other information needed for the computation); (iii) processing of received signals to determine position information (e.g., times of arrival or travel time of the signals, pseudoranges between the mobile device and transmitters, transmitter atmospheric conditions, transmitter and/or locations or other transmitter information); (iv) use of position information to compute an estimated position of the mobile device; (v) determination of movement based on measurements from inertial sensors of the mobile device; (vi) GNSS signal processing; or (vii) other processing as required by operations described in this disclosure.

By way of example in FIG. 27, the server 2703 may include: a mobile device interface 31 for exchanging information with a mobile device (e.g., an antenna, a network interface, or other); one or more processor(s) 32; memory/data source 33 for providing storage and retrieval of information and/or program instructions; a transmitter interface 34 for exchanging information with a transmitter (e.g., an antenna, a network interface, or other); and any other components known to one of ordinary skill in the art. The memory/data source 33 may include a memory storing software modules with executable instructions, and the processor(s) 32 may perform different actions by executing instructions from the modules, including (i) performance of a part or all of the methods as described herein or otherwise understood by one of ordinary skill in the art as being performable at the server; (ii) estimation of an altitude of the mobile device; (iii) computation of an estimated position of the mobile device; or (iv) other processing as required by operations described in this disclosure. Steps performed by servers as described herein may also be performed on other machines that are remote from a mobile device, including computers of enterprises or any other suitable machine.

Certain aspects disclosed herein relate to estimating the positions of mobile devices—e.g., where the position is represented in terms of latitude, longitude, and/or altitude coordinates; x, y, and/or z coordinates; angular coordinates; or other representations. Various techniques to estimate the position of a mobile device can be used, including trilateration, which is the process of using geometry to estimate the position of a mobile device using distances traveled by different "positioning" (or "ranging") signals that are received by the mobile device from different beacons (e.g., terrestrial transmitters and/or satellites). If position information like the transmission time and reception time of a positioning signal from a beacon is known, then the difference between those times multiplied by the speed of light would provide an estimate of the distance traveled by that positioning signal from that beacon to the mobile device.

Different estimated distances corresponding to different positioning signals from different beacons can be used along with position information like the locations of those beacons to estimate the position of the mobile device. Positioning systems and methods that estimate a position of a mobile device (in terms of latitude, longitude, and/or altitude) based on positioning signals from beacons (e.g., transmitters, and/or satellites) and/or atmospheric measurements are described in co-assigned U.S. Pat. No. 8,130,141, issued Mar. 6, 2012, and U.S. Pat. No. 9,057,606, issued Jun. 16, 2015, incorporated by reference herein in its entirety for all purposes. It is noted that the term "positioning system" may refer to satellite systems (e.g., Global Navigation Satellite Systems (GNSS) like GPS, GLONASS, Galileo, and Compass/Beidou), terrestrial transmitter systems, and hybrid satellite/terrestrial systems.

Reference has been made in detail to embodiments of the disclosed invention, one or more examples of which have been illustrated in the accompanying figures. Each example has been provided by way of an explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method, comprising:
    identifying a plurality of calibration values of an initial calibration dataset, wherein one or more calibration values of the plurality of calibration values were derived using an atmospheric pressure measurement from a barometric air pressure sensor of a mobile device;
    determining a calibration metric for each calibration value of the plurality of calibration values by determining, for each calibration value, if that calibration value was derived based on an atmospheric pressure measurement that was made when the mobile device was inside a building;
    filtering out one or more of the calibration values from the initial calibration dataset based on the calibration metric to generate a filtered calibration dataset upon determining that the one or more of the calibration values was derived based on an atmospheric pressure measurement that was made when the mobile device was inside the building;
    determining a filtered calibration value using the filtered calibration dataset; and
    calibrating the barometric air pressure sensor of the mobile device using the filtered calibration value.

2. The method of claim 1, wherein:
    each of the calibration values comprises either a calibration offset value or a calibration polynomial.

3. A method, comprising:
    identifying a plurality of calibration values of an initial calibration dataset, wherein one or more calibration values of the plurality of calibration values were derived using an atmospheric pressure measurement from a barometric air pressure sensor of a mobile device;
    determining a calibration metric for each calibration value of the plurality of calibration values by determining a plurality of respective Z-metrics for the plurality of calibration values;
    filtering out one or more of the calibration values from the initial calibration dataset based on the calibration metric to generate a filtered calibration dataset;
    determining a filtered calibration value using the filtered calibration dataset; and
    calibrating the barometric air pressure sensor of the mobile device using the filtered calibration value.

4. The method of claim 3, wherein:
    filtering out one or more of the calibration values from the initial calibration dataset based on the calibration metric comprises:
    identifying a Z-metric threshold value;
    comparing each Z-metric of the plurality of respective Z-metrics to the Z-metric threshold value; and
    upon determining that a Z-metric exceeds the Z-metric threshold value, filtering out a calibration value that corresponds to that Z-metric from the initial calibration dataset.

5. The method of claim 3, wherein:
    filtering out one or more of the calibration values from the initial calibration dataset based on the calibration metric comprises:
    identifying a Z-metric threshold value;
    comparing each Z-metric of the plurality of respective Z-metrics to the Z-metric threshold value;
    upon determining that a Z-metric exceeds the Z-metric threshold value, incrementing a Z-metric threshold count associated with that calibration value; and
    upon determining that the Z-metric threshold count exceeds a Z-metric count threshold value, filtering out the calibration value that corresponds to that Z-metric threshold count from the initial calibration dataset.

6. The method of claim 3, wherein:
    filtering out one or more of the calibration values from the initial calibration dataset based on the calibration metric comprises:
    identifying a Z-metric threshold value;
    comparing each Z-metric of the plurality of respective Z-metrics to the Z-metric threshold value;
    determining an average Z-metric associated with that calibration value; and
    upon determining that the average Z-metric exceeds a Z-metric average threshold value, filtering out the calibration value that corresponds to that Z-metric average from the initial calibration dataset.

7. The method of claim 3, wherein:
    filtering out one or more of the calibration values from the initial calibration dataset based on the calibration metric comprises:
    identifying a Z-metric threshold value;
    identifying a first calibration value of the initial calibration dataset having a first Z-metric and a second calibration value of the initial calibration dataset having a second Z-metric; and
    upon determining that the second Z-metric of the second calibration value exceeds the Z-metric threshold value:

generating a first comparison value by comparing the first Z-metric to the second Z-metric;
generating a second comparison value by comparing the second Z-metric to the first Z-metric;
upon determining that the first comparison value is greater than a first threshold value and that the second comparison value is less than a second threshold value, filtering out the second calibration value from the initial calibration dataset; and
upon determining that the first comparison value is not greater than the first threshold value or that the second comparison value is not less than a second threshold value, leaving the second calibration value in the initial calibration dataset.

8. A method, comprising:
identifying a plurality of calibration values of an initial calibration dataset, wherein one or more calibration values of the plurality of calibration values were derived using an atmospheric pressure measurement from a barometric air pressure sensor of a mobile device;
determining a calibration metric for each calibration value of the plurality of calibration values further comprises by determining a positional relationship between an estimated position of the mobile device and a building footprint;
filtering out one or more of the calibration values from the initial calibration dataset based on the calibration metric-to generate a filtered calibration dataset by filtering out calibration values from the initial calibration dataset based on the determined positional relationship between the mobile device and the building footprint;
determining a filtered calibration value using the filtered calibration dataset; and
calibrating the barometric air pressure sensor of the mobile device using the filtered calibration value.

9. The method of claim 8, wherein:
the positional relationship between the mobile device and the building footprint is a percentage overlap of an estimated 2D position area of the mobile device and the building footprint; and
calibration values are filtered out of the initial calibration dataset if the overlap is greater than a threshold value.

10. The method of claim 8, wherein:
the positional relationship between the mobile device and the building footprint is a distance between a centroid of an estimated 2D position area of the mobile device and an outer perimeter of the building footprint; and
calibration values are filtered out of the initial calibration dataset if the distance is less than a threshold value.

11. The method of claim 8, wherein:
the positional relationship between the mobile device and the building footprint is a nearest distance between an estimated 2D position area of the mobile device and an outer perimeter of the building footprint; and
calibration values are filtered out of the initial calibration dataset if the nearest distance is less than a threshold value.

12. A method, comprising:
identifying a plurality of calibration values of an initial calibration dataset, wherein one or more calibration values of the plurality of calibration values were derived using an atmospheric pressure measurement from a barometric air pressure sensor of a mobile device;
determining a calibration metric for each calibration value of the plurality of calibration values;
filtering out one or more of the calibration values from the initial calibration dataset based on the calibration metric to generate a filtered calibration dataset;
determining a filtered calibration value using the filtered calibration dataset; and
calibrating the barometric air pressure sensor of the mobile device using the filtered calibration value;
wherein:
determining the calibration metric for each calibration value of the plurality of calibration values comprises:
determining, for each calibration value, a calibration range based on a calibration offset value or a calibration polynomial;
determining an overlap ratio between each of the calibration ranges and a corresponding previously derived calibration range; and
filtering out one or more of the calibration values from the initial calibration dataset based on the calibration metric comprises:
identifying an overlap ratio threshold; and
filtering calibration values from the initial calibration dataset if the overlap ratio associated with that calibration value exceeds the overlap ratio threshold.

13. A method, comprising:
identifying a plurality of calibration values of an initial calibration dataset, wherein one or more calibration values of the plurality of calibration values were derived using an atmospheric pressure measurement from a barometric air pressure sensor of a mobile device;
determining a calibration metric for each calibration value of the plurality of calibration values by determining a calibrated value of another device that is within a threshold distance from the mobile device;
filtering out one or more of the calibration values from the initial calibration dataset based on the calibration metric to generate a filtered calibration dataset;
determining a filtered calibration value using the filtered calibration dataset; and
calibrating the barometric air pressure sensor of the mobile device using the filtered calibration value;
wherein:
filtering out one or more of the calibration values from the initial calibration dataset based on the calibration metric comprises:
calibrating the mobile device using each calibration value of the plurality of calibration values;
comparing a calibrated value derived using the calibrated mobile device to the calibrated value of the other device; and
filtering out calibration values from the initial calibration dataset if a difference between the calibrated value derived using the calibrated mobile device and the calibrated value of the other device exceeds a threshold value.

14. A method, comprising:
identifying a plurality of calibration values of an initial calibration dataset, wherein one or more calibration values of the plurality of calibration values were derived using an atmospheric pressure measurement from a barometric air pressure sensor of a mobile device;
determining a calibration metric for each calibration value of the plurality of calibration values by determining if that calibration value was derived using an atmospheric pressure measurement made by the barometric air pressure sensor of the mobile device when the mobile device was inside of a vehicle;

filtering out one or more of the calibration values from the initial calibration dataset based on the calibration metric to generate a filtered calibration dataset by filtering out the one or more of the calibration values from the initial calibration dataset if the one or more of the calibration values was derived based on an atmospheric pressure measurement that was made when the mobile device was inside a vehicle;

determining a filtered calibration value using the filtered calibration dataset; and calibrating the barometric air pressure sensor of the mobile device using the filtered calibration value.

15. The method of claim 1, wherein:

filtering out a calibration value from the initial calibration dataset comprises deleting that calibration value from the initial calibration dataset.

16. The method of claim 1, wherein:

filtering out a calibration value from the initial calibration dataset comprises weighting that calibration value such that the weighted calibration value makes less of a contribution to the filtered calibration value as compared to calibration values that were not filtered out of the initial calibration dataset.

17. The method of claim 1, wherein:

filtering out a calibration value out from the initial calibration dataset comprises flagging that calibration value as a suspect calibration value for postprocessing by a server.

18. An apparatus, comprising:

a barometric air pressure sensor;

a data storage module; and a processor configured to:

identify a plurality of calibration values of an initial calibration dataset, wherein one or more calibration values of the plurality of calibration values were derived using an atmospheric pressure measurement from the barometric air pressure sensor of the apparatus;

determine a calibration metric for each calibration value of the plurality of calibration values by determining a plurality of respective Z-metrics for the plurality of calibration values;

filter out one or more of the calibration values from the initial calibration dataset based on the calibration metric to generate a filtered calibration dataset;

determine a filtered calibration value using the filtered calibration dataset; and calibrate the barometric air pressure sensor of the apparatus using the filtered calibration value;

wherein:

filtering one or more of the calibration values from the initial calibration dataset based on the calibration metric comprises:

identifying a Z-metric threshold value;

comparing each Z-metric of the plurality of Z-metrics to the Z-metric threshold value; and upon determining that a Z-metric exceeds the Z-metric threshold value, filtering out a calibration value that corresponds to that Z-metric from the initial calibration dataset.

* * * * *